United States Patent
Cao et al.

(10) Patent No.: US 12,442,052 B2
(45) Date of Patent: Oct. 14, 2025

(54) ANALYSIS OF POLYNUCLEOTIDES

(71) Applicant: BioNano Genomics, Inc., Philadelphia, PA (US)

(72) Inventors: Han Cao, San Diego, CA (US); Alex R. Hastie, San Diego, CA (US); Ernest Tsz-Tsun Lam, San Diego, CA (US); Željko Džakula, San Diego, CA (US)

(73) Assignee: BIONANO GENOMICS, INC., San Diego, CA (US)

( * ) Notice: Subject to any disclaimer, the term of this patent is extended or adjusted under 35 U.S.C. 154(b) by 44 days.

(21) Appl. No.: 14/897,213

(22) PCT Filed: Jun. 9, 2014

(86) PCT No.: PCT/US2014/041568
§ 371 (c)(1),
(2) Date: Dec. 9, 2015

(87) PCT Pub. No.: WO2014/200926
PCT Pub. Date: Dec. 18, 2014

(65) Prior Publication Data
US 2016/0201147 A1    Jul. 14, 2016

Related U.S. Application Data

(60) Provisional application No. 61/833,378, filed on Jun. 10, 2013.

(51) Int. Cl.
| | |
|---|---|
| C12Q 1/70 | (2006.01) |
| C12Q 1/6858 | (2018.01) |
| C12Q 1/6886 | (2018.01) |
| C12Q 1/6893 | (2018.01) |
| G16B 30/00 | (2019.01) |
| G16B 30/10 | (2019.01) |

(52) U.S. Cl.
CPC ........... *C12Q 1/705* (2013.01); *C12Q 1/6858* (2013.01); *C12Q 1/6886* (2013.01); *C12Q 1/6893* (2013.01); *G16B 30/00* (2019.02); *G16B 30/10* (2019.02); *Y02A 50/30* (2018.01)

(58) Field of Classification Search
None
See application file for complete search history.

(56) References Cited

U.S. PATENT DOCUMENTS

| | | | |
|---|---|---|---|
| 2010/0330557 A1 | 12/2010 | Yakhini et al. | |
| 2011/0171634 A1* | 7/2011 | Xiao ................... | C12Q 1/6825 435/6.1 |
| 2012/0237936 A1* | 9/2012 | Xiao ...................... | C12Q 1/683 435/6.11 |
| 2012/0254213 A1* | 10/2012 | Morgan ................. | G16B 30/10 707/E17.014 |
| 2012/0283955 A1* | 11/2012 | Cameron ............... | G16B 40/00 702/19 |

FOREIGN PATENT DOCUMENTS

| | | |
|---|---|---|
| WO | WO 2009/052366 | 4/2009 |
| WO | WO 2010/002883 | 1/2010 |
| WO | WO 2013/016420 | 1/2013 |

OTHER PUBLICATIONS

Lam et al. Genome mapping on nanochannel arrays for structural variation analysis and sequence assembly. Published online Jul. 15, 2012, Nature Biotechnology. vol. 30, No. 8, pp. 771-777.*
A sequence-independent in vitro transposon-based strategy for efficient cloning of genomes of large DNA viruses as bacterial artificial chromosomes. Published online Nov. 6, 2008. Nucleic Acids Research. vol. 37, No. 1, e2, p. 1-8. (Year: 2008).*
Neely et al., Optical Mapping of DNA: Single-Molecule-Based Methods for Mapping Genomes. Biopolymers (2011), 95(5): 298-311 (Year: 2011).*
Reisinger et al., Visualization of episomal and integrated Epstein-Barr virus DNA by fiber fluorescence in situ hybridization. Int. J. Cancer (2006), 118: 1603-1608 (Year: 2006).*
Mahiet et al., Structural Variability of the Herpes Simplex Virus 1 Genome In Vitro and In Vivo. Journal of Virology (2012), 86(16): 8592-8601 (Year: 2012).*
Human herpesvirus 4 type 1, complete genome, NCBI Reference Sequence: NC_007605.1 https://www.ncbi.nlm.nih.gov/nuccore/NC_007605.1 [retrieved Sep. 23, 2022]; published Mar. 26, 2010 (Year: 2010).*
Nakano et al., Rearrangements of large-insert T-DNAs in transgenic rice. Mol Gen Genomics (2005) 273: 123-129 (Year: 2005).*
T4 DNA Ligase Reaction Buffer, https://www.neb.com/en-us/products/b0202-t4-dna-ligase-reaction-buffer, [retrieved Jan. 6, 2024] (Year: 2024).*
Yant et al., High-Resolution Genome-Wide Mapping of Transposon Integration in Mammals. Molecular and Cellular Biology (2005), 25: 2085-2094 (Year: 2005).*
Mitchell et al., Retroviral DNA Integration: ASLV, HIV, and MLV Show Distinct Target Site Preferences PLOS Biology (2004), 2: e234, 1127-1137 (Year: 2004).*
Kotewicz et al., Optical maps distinguish individual strains of *Escherichia coli* O157 : H7. Microbiology (2007), 153: 1720-1733 (Year: 2007).*
Neely et al., DNA fluorocode: A single molecule, optical map of DNA with nanometre resolution. Chemical Science (2010), 1: 453-460 (Year: 2010).*
Lim et al., DNA methylation profiling in nanochannels. Biomicrofluidics (2011), 5: 034106 (Year: 2011).*

(Continued)

*Primary Examiner* — Abigail Vanhorn
*Assistant Examiner* — Catherine Konopka
(74) *Attorney, Agent, or Firm* — Dickinson Wright PLLC

(57) ABSTRACT

According to some embodiments herein, methods and kits for labeling and analyzing nucleic acids are provided. In some embodiments, sequence-specific labeling is performed on polynucleotide sequences associated with a host genome, and the presence or absence of patterns characteristic of extragenomic sequences are determined.

12 Claims, 15 Drawing Sheets
Specification includes a Sequence Listing.

(56) References Cited

OTHER PUBLICATIONS

GenBank: AE005174.2, *Escherichia coli* O157:H7 str. EDL933 genome, published Mar. 5, 2010 https://www.ncbi.nlm.nih.gov/nuccore/56384585?sat=21&satkey=88139170, [retrieved Jan. 5, 2024] (Year: 2010).*
Meltzer et al., A lab-on-chip for biothreat detection using single-molecule DNA mapping. Lab Chip (2011), 11: 863-873 (Year: 2011).*
Géron-Landre et al., Sequence-specific fluorescent labeling of doublestranded DNA observed at the single molecule level. Nucleic Acids Research (2003), 31(20), e125, 1-8 (Year: 2003).*
Zohar and Muller, Labeling DNA for single-molecule experiments: methods of labeling internal specific sequences on double-stranded DNA. Nanoscale (2011), 3: 3027-3039 (Year: 2011).*
Piovesan et al., On the length, weight and GC content of the human genome. BMC Res Notes (2019), 12:106, 1-7 (Year: 2019).*
Reich and Masshoon, Kinetic Mechanism of the EcoRI DNA Methyltransferase, Biochemistry (1991), 30: 2933-2939 (Year: 1991).*
Feehery et al., A Method for Selectively Enriching Microbial DNA from Contaminating Vertebrate Host DNA. PLOS One (2013), 8, e76096: 1-13 (Year: 2013).*
Nielson and Egholm, An introduction to peptide nucleic acid, Current Issues Molec. Biol. (1999) 1(2): 89-104 (Year: 1999).*
Baday et al., Jun. 11, 2012, Multicolor super-resolution DNA imaging for genetic analysis, Nano Lett, 12(7):3861-3866 and Supplementary Information.
Ben-David et al., Feb. 1990, Identification and mapping of a common proviral integration site Fli-1 in erythroleukemia cells induced by Friend murine leukemia virus, Proc. Nat. Acad. Sci, 87(4):1332-1336.
Das et al., 2010, Single molecule linear analysis of DNA in nano-channel labeled with sequence specific fluorescent probes. Nucleic Acids Research 38(18):e177.
Extended European Search Report dated Jan. 24, 2017 in patent application No. 14811715.3.
Hastie et al., Feb. 6, 2013, Rapid Genome Mapping in Nanochannel Arrays for Highly Complete and Accurate De Novo Sequence Assembly of the Complex *Aegilops tauschii* Genome, PLOS One, 8(2):e55864.
International Search Report and Written Opinion dated Jan. 5, 2015 in PCT/US14/41568.
Xiao et al., Jan. 2007, Rapid DNA mapping by fluorescent single molecule detection, Nucleic Acids Research, 35(3):1-12.
Office Action dated Jul. 25, 2019 for Chinese Application No. 201480044219.X (with machine translation).
IUPAC. "Limit of detection." Compendium of Chemical Terminology, 2nd ed. (the "Gold Book"). Compiled by A. D. McNaught and A. Wilkinson. Blackwell, Scientific Publications, Oxford (1997). XML on-line corrected version: http://goldbook.iupac.org (2006-), created by M. Nic, J. Jirat, B. Accessed at doi.org/10.1351/goldbook. L03540, which bears a last updated date of Feb. 24, 2014.
Office Action dated Jul. 10, 2018 in Japanese Application No. 2016-519575 with English Translation.
Office Action dated Sep. 30, 2018 in Chinese Application No. 201480044219.X with English Translation.
Feehery et al., "A Method for Selectively Enriching Microbial DNA from Contaminating Vertebrate Host DNA," PLoS One 2013, 8, 1-13.
Hecht et al., "Inheritance of DNA Transferred from American Trypanosomes to Human Hosts," PLoS One 2010, 5(2), e9181 in 15 pages.
Llosa et al., "New perspectives into bacterial DNA transfer to human cells," Trends in Microbiology 2012, 20, 355-359.
International Preliminary Report on Patentability dated Jun. 19, 2015 in PCT Patent Application No. PCT/US2014/041568.
Notice of Allowance dated Jun. 11, 2019 in Japanese Patent Application No. 2016-519575.
Notice of Allowance dated May 15, 2020 in Chinese Patent Application No. 201480044219.
Rubin, "The early history of tumor virology: Rous, RIF, and RAV," PNAS 2011, 108(35), 14389-14396.

* cited by examiner

First, Generate Flap Sequences by nicking and displacing downstream strand

Genome Map
de novo pattern
showing viral
signature

High virus load
1865 X

~42
copies/haploid
(confirmed with
sequencing
50K/haploid)

Molecules aligned
to an in silico Map
generated by
virus sequencing
assembly.
Almost same
signature

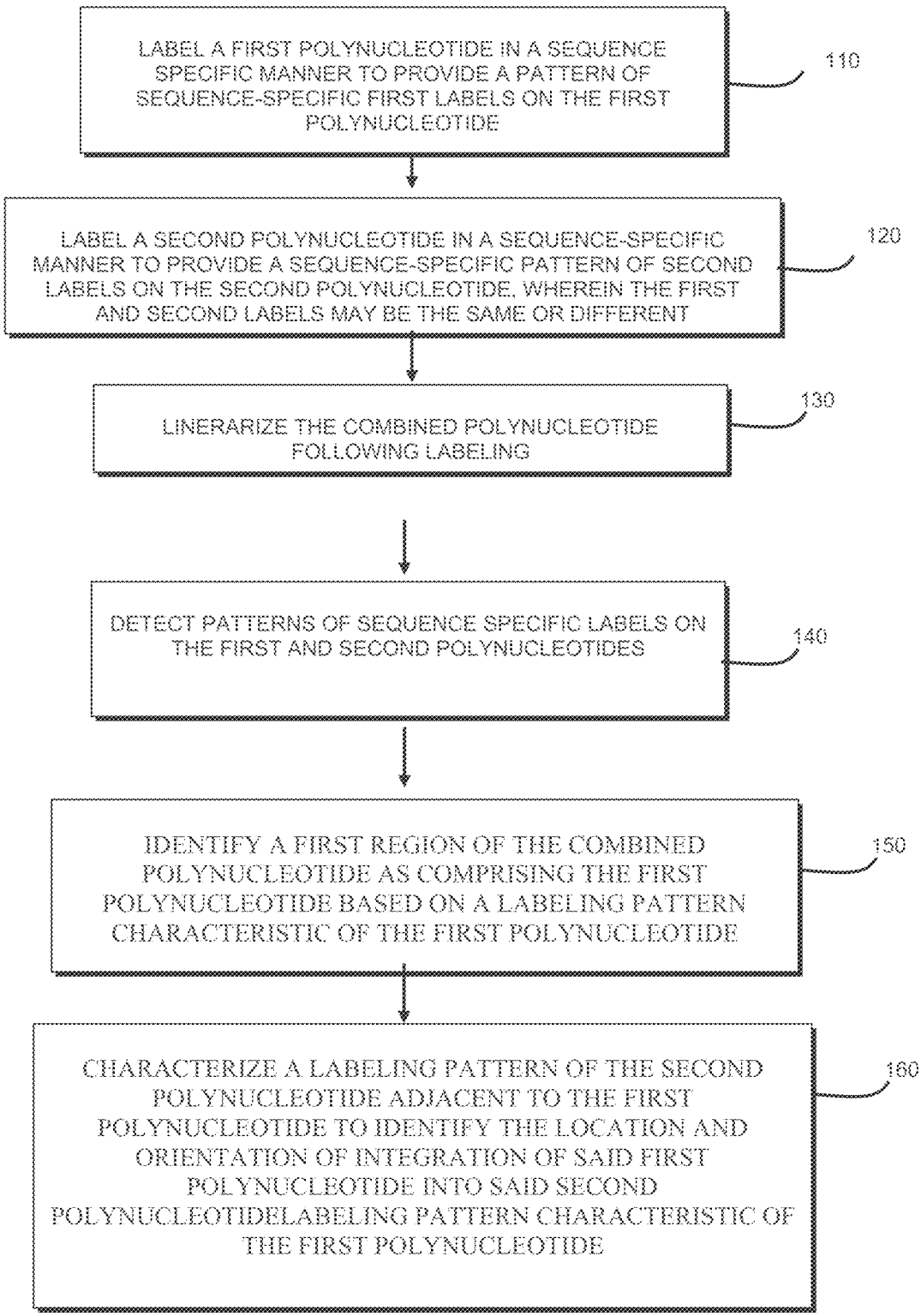

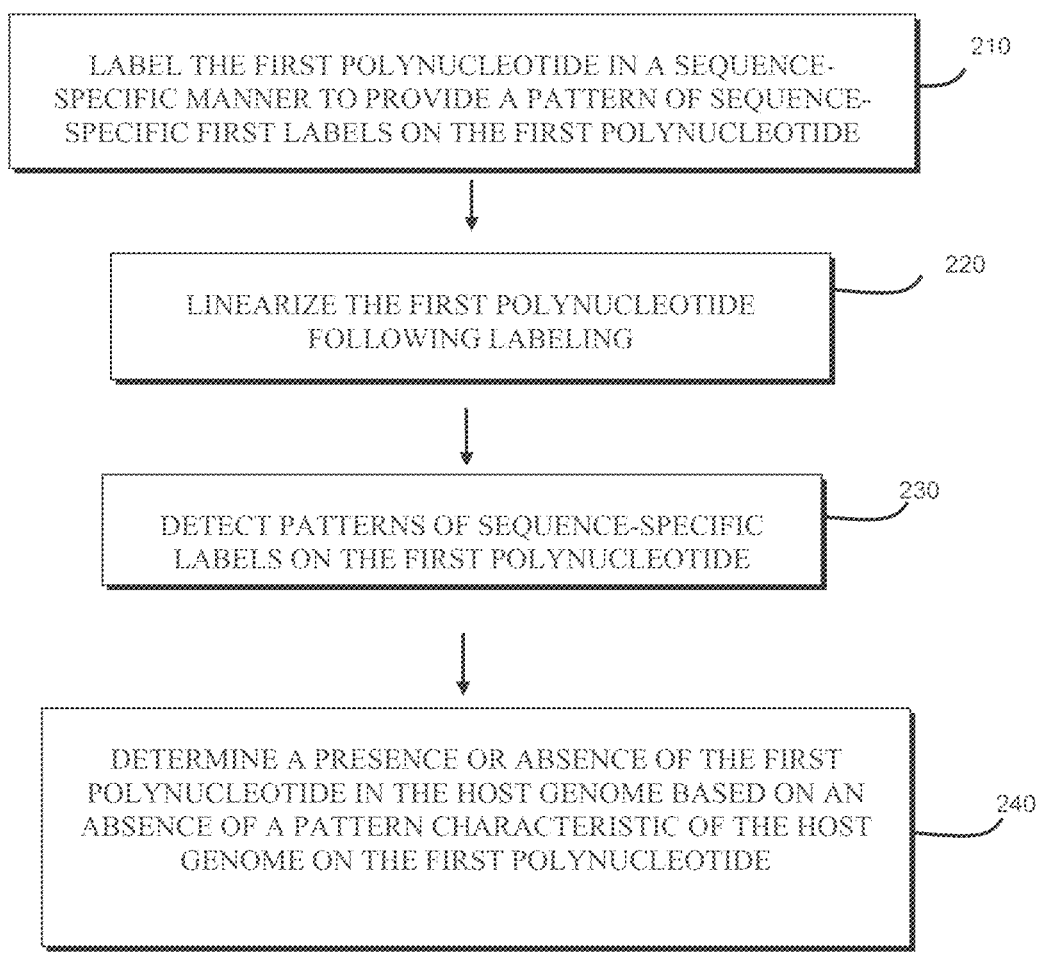

Figure 13

| Name | Genome Size | Total Contigs | Mappability (50-mer) | GC% | N% | Nick density (BspQ1/100Kb) | Nick Density (BbvCI)/(100Kb) |
|---|---|---|---|---|---|---|---|
| T. Cruzi (8 versions) | 279,187,253 | 76427 | 0.946 | 51.11 | 10.7 | 15.410 | 19.078 |
| T. brucei | 35,826,294 | 131 | 0.828 | 45.49 | 0.03 | 17.669 | 16.854 |
| T. pallidum | 1,138,011 | 1 | 0.987 | 52.78 | 0.00 | 18.19 | 14.060 |
| P. falciparum | 23,328,019 | 16 | 0.989 | 19.34 | 0.00 | 3.459 | 0.836 |

Figure 14

ANALYSIS OF POLYNUCLEOTIDES

CROSS-REFERENCE TO RELATED APPLICATIONS

This application is the US national phase of PCT Application No. PCT/US2014/041568, filed Jun. 9, 2014, which claims a priority benefit from U.S. Provisional Patent Application No. 61/833,378, entitled "ANALYSIS OF POLYNUCLEOTIDES," filed on Jun. 10, 2013, which is incorporated herein by reference in its entirety.

SEQUENCE LISTING IN ELECTRONIC FORMAT

The present application is being filed along with a Sequence Listing in electronic format. The Sequence Listing is provided as a file entitled BNGEN023NPSEQUENCE.txt, created on Jan. 26, 2016, last modified on Mar. 21, 2016, which is 1,115 bytes in size. The information in the electronic format of the Sequence Listing is incorporated herein by reference in its entirety

BACKGROUND

Polynucleotides, such as DNA or RNA, are long polymer chains of nucleotides, whose linear sequence is directly related to the genomic and post-genomic gene expression information of the host organism. Polynucleotides can be single-stranded or double-stranded.

Direct sequencing and mapping of sequence regions, motifs, and functional units such as open reading frames (ORFs), untranslated regions (UTRs), exons, introns, protein factor binding sites, epigenomic sites such as CpG clusters, microRNA sites, transposons, reverse transposons and other structural and functional units can be useful in assessing of the genomic composition, detecting the presence of extragenomic polynucleotides in a biological sample, and assessing the "health profile" of individual organisms, including humans.

In some cases, the complex rearrangement of the nucleotides' sequence, including segmental duplications, insertions, deletions, inversions and translocations, during an individual's life span leads to disease states including genetic abnormalities or cell malignancy. In some cases, sequence differences, copy number variation (CNV), and other differences between different individuals' genetic makeup reflect the diversity of the genetic makeup of the population and result in differential responses to environmental stimuli and other external influences, such as drug treatments. Genomic structural variation (SV) is common across the genome, even among healthy individuals.

Extragenomic material can frequently be associated with a host organism's genome, or even become integrated in the host organism's genome. For example, a variety of viruses can mediate the integration of foreign genetic material into a host genome. For example retrovirus and retrovirus-like elements (for example degenerate retroviruses that have lost one or more elements for viral function such as a gene encoding a viral envelope protein, retrotransposon elements such as LTRs, non-LTR retrotransposons such as LINEs and SINEs, and the like) include an RNA genome that can be reverse-transcribed and integrated into a host DNA genome. Upon integration into a host genome, a retrovirus or retrovirus-like element can be transcribed, thus producing more RNA viral genomes that can be reverse-transcribed and integrated into additional sites of the host genome, and as such can rapidly proliferate in a host genome. Thus, retroviruses and retroviral-like elements can affect the structure of a host genome, and can affect the function of one or more host genes, for example by inserting in, and therefore disrupting a host gene. Moreover, upon integration, retroviruses and retroviral-like elements can proliferate and be integrated into additional sites in the host genome, but are not readily excised, and as such, patterns of accumulated retroviruses and retroviral-like elements can be indicative of cell lineage. Many other viruses are known. For example DNA can be inserted into, and excised from a host genome. Baculoviruses are an example of DNA viruses that can have a double-stranded DNA genome, and can infect insect hosts. Certain bacteriophages are an example of DNA viruses that can have a single-stranded DNA genome, and can infect bacteria.

Some cancers can be associated with delivery of extragenomic material to a host genome. For example, accumulated viral delivery of one or more oncogenes to the genome of a host cell can facilitate the development of a cancer phenotype in that host cell, as can disruption of one or more tumor suppressor genes in the host cell genome by insertion of viral sequences into the host genome. For example, human T-lymphocytotropic virus is a virus associated with human cancers and has been implicated in adult T-cell lymphoma virus type 1. The HTLV genome is composed of two copies of single stranded RNA virus, in which the genome is copied into a double stranded DNA that is integrated into the host cell genome. As such, either or both viral copy number and location can be indicative and predicative of a cancer phenotype, or of a predisposition for developing a cancer phenotype. See Rubin, H. (2012) *Proc. Nat. Acad. Sci.* 108: 14389-14396, which is hereby incorporated by reference in its entirety.

Extragenomic material can become associated with a host genome through other mechanisms as well. For example, lateral gene transfer can occur. Lateral gene transfer includes the transfer of genetic information from a first organism via a mechanism different from parent-to-child gene transfer (e.g. a mechanism that does not involve sexual or asexual reproduction). For example, a retrovirus can become inserted in a first host genome, and incorporated into a portion of the first host genome in its transcript, so as to produce a virus that, upon infection of a second host genome, can incorporate a portion of the first host genome into the second host genome. For example, interspecies gene transfer can be mediated by a bacterial pathogen infecting a host. For example, infection of humans by the protozoan *T. cruzi* have been documented, and frequently include integration of mitochondrial minicircles into retrotransposable LINE-1 elements of various host chromosomes. *T. cruzi*-mediated DNA transfer can cause Chagas heart disease in human patients. Additional examples of interspecies gene transfer from bacteria to human cells, for example by the intravacuolar pathogen *Salmonella enterica*, and by the intracytoplasmic pathogen *Listeria monocytogenes* can be found in Llosa et al. (2012), Trends Microbiol 20: 355-9, and Hecht et al. (2010), PLOS ONE 5: e 9181, each of which is hereby incorporated by reference in its entirety.

Many types of cancers, bacterial, parasitic and viral diseases can be caused by abnormalities and variations in the genome. Despite many types of genome wide approaches for detection of disease, many are also indirect in quantifying specific copy numbers of pathogenic polynucleotides within host genomes, location mapping of pathogenic nucleotides within the host genome, and in assembling large complex genomes to map locations of extragenomic material, in which the current techniques and approaches have a very low level of accuracy. There is a need for methods and kits for characterizing polynucleotides, and determining the presence or absence of polynucleotide structural patterns of pathogens in a biological sample, and in a subject.

FIELD

Embodiments provided herein relate generally to nanotechnology and analysis of nucleic acids. Some embodiments herein relate to single-molecule genomic analysis.

SUMMARY

According to some aspects, a method of characterizing a first polynucleotide integrated into a second polynucleotide, which together comprise a combined polynucleotide is provided. The method can comprise labeling the first polynucleotide in a sequence-specific manner to provide a pattern of sequence-specific first labels on the first polynucleotide. The method can comprise labeling the second polynucleotide in a sequence-specific manner to provide a sequence-specific pattern of second labels on the second polynucleotide. In some embodiments the first and second labels may be the same or different. The method can include linearizing the combined polynucleotide following labeling. The method can include detecting patterns of sequence-specific labels on the first and second polynucleotides. The method can include identifying a first region of the combined polynucleotide as comprising the first polynucleotide based on a labeling pattern characteristic of the first polynucleotide. The method can include characterizing a labeling pattern of the second polynucleotide adjacent to the first polynucleotide to identify the location and orientation of integration of said first polynucleotide into said second polynucleotide. In some embodiments, the method further comprises determining a copy number of the first polynucleotide. In some embodiments, determining a copy number comprises determining a ratio of per-base coverage depth of the first polynucleotide to per-base coverage depth of the second polynucleotide. In some embodiments, the first polynucleotide comprises at least one of a single-stranded DNA, single-stranded RNA, double-stranded DNA, or double-stranded RNA. In some embodiments, the first polynucleotide is selected from the group consisting of: a viral sequence, a bacterial sequence, a mitochondrial sequence, a chloroplast sequence, an episomal sequence, a mini-chromosomal sequence, a transposable element sequence, and a phage sequence. In some embodiments, the second polynucleotide comprises a host genomic sequence. In some embodiments, the host comprises a human. In some embodiments, the second polynucleotide comprises a genomic sequence of a cell in a disease state. In some embodiments, the disease state comprises a cancer. In some embodiments, the method further includes providing at least a pattern of sequence-specific labels of a third polynucleotide, identifying a region of the third polynucleotide at least similar to the first polynucleotide based on a labeling pattern characteristic of the first polynucleotide within at least a region of the third polynucleotide, and determining a phylogenetic relationship between said first polynucleotide and said third polynucleotide based upon the labeling pattern characteristic of said first polynucleotide. In some embodiments, the pattern of sequence specific labels of the third polynucleotide comprises an in silico pattern on a reference sequence. In some embodiments, the method further comprises labeling the third polynucleotide in a sequence-specific manner to provide a sequence-specific pattern of third labels on the third polynucleotide, linearizing the third polynucleotide following labeling, and detecting patterns of sequence-specific labels on the third polynucleotide. In some embodiments, any two of the first label, the second label, and the third label may be the same or different. In some embodiments, the phylogenetic relationship comprises an interspecies polynucleotide transfer event. In some embodiments, the phylogenetic relationship comprises a lateral DNA transfer event. In some embodiments, the method further comprises providing at least one location of integration of said first polynucleotide in a fourth polynucleotide, and determining a phylogenetic relationship between said second polynucleotide and said fourth polynucleotide based upon the at least one location of integration of said first polynucleotide in said second polynucleotide, and the at least one location of integration of said first polynucleotide in said fourth polynucleotide. In some embodiments, the at least one location of integration of said first polynucleotide in said fourth polynucleotide is provided in silico. In some embodiments, linearizing is performed using at least one nanochannel. In some embodiments, the at least one pattern of sequence-specific labeling is selected to differentiate extragenomic nucleic acid sequences from host nucleic acid sequences. In some embodiments, a label density is selected to differentiate patterns of extragenomic nucleic acid sequences from those of host nucleic acid sequences. In some embodiments, the at least one reference pattern of sequence-specific labeling is selected to comprise a label density of about 5 labels to about 20 labels per 100 kb. In some embodiments, the at least one reference pattern of sequence-specific labeling is selected to comprise a label density of about 5 labels, about 10 labels, about 15 labels, about 20 labels per 100 kb, to about any amount of label density between these values.

Some aspects include a method of characterizing at least a first polynucleotide associated with a host genome. The method can comprise labeling the first polynucleotide in a sequence-specific manner to provide a pattern of sequence-specific first labels on the first polynucleotide, linearizing the first polynucleotide following labeling, detecting patterns of sequence-specific labels on the first polynucleotide, and determining a presence or absence of the first polynucleotide in the host genome based on an absence of a pattern characteristic of the host genome on the first polynucleotide. In some embodiments, the method further comprises labeling a plurality of polynucleotides associated with the host genome, in a sequence-specific manner to provide a pattern of sequence-specific labels on each of the plurality of polynucleotides, detecting patterns of sequence-specific labels on each of the plurality of polynucleotides, detecting a presence or absence of a pattern characteristic of the first polynucleotide on at least some of the plurality of polynucleotides, and identifying a consensus pattern based on similarities between the pattern characteristic of the first polynucleotide and patterns of at least some of the plurality of polynucleotides. In some embodiments, the first polynucleotide comprises a pattern on each of a first end and a second end of the first polynucleotide. In some embodiments, patterns on the first and second ends characteristic of the consensus pattern, but not of any region of host genome indicate that the first polynucleotide is not integrated into the host genome. In some embodiments, the method further comprises determining a copy number of the first polynucleotide. In some embodiments, the method further comprises determining a copy number of the first polynucleotide. In some embodiments, determining a copy number comprises determining a ratio of per-base coverage depth of polynucleotides substantially comprising the consensus pattern to per-base coverage depth of the host genome. In some embodiments, the pattern characteristic of the host genome comprises an in silico pattern on a reference sequence. In some embodiments, the method further comprises labeling a polynucleotide of the host genome in a sequence-specific manner to provide a pattern of sequence-specific second labels on the polynucleotide sequence of the host genome, wherein the first and second label can be the same or different, linearizing the polynucleotide of the host genome following labeling, and detecting patterns of sequence-specific labels on the host genome, thereby providing at least the pattern characteristic of the host genome. In some embodiments, the first polynucleotide comprises at least one of a single-stranded DNA, single-stranded RNA, double-stranded DNA, or double-stranded RNA. In some embodiments, the first polynucleotide is selected from the group consisting of: a viral sequence, a bacterial sequence, a mitochondrial sequence, a chloroplast sequence, an episomal sequence, a mini-chromosomal sequence, a transposable element sequence, and a phage sequence. In some embodiments, the host comprises a human. In some embodiments, linearizing is performed in at least one nanochannel.

In some aspects, a method of determining the presence or absence of one or more foreign elements in a biological sample is provided. The method can comprise providing at least one reference pattern of sequence-specific labeling of foreign element nucleic acid, providing a biological sample comprising a plurality of polynucleotides, labeling the polynucleotides of the biological sample in a sequence-specific manner to provide a pattern of sequence-specific first labels on the first polynucleotide, linearizing the polynucleotides following labeling detecting patterns of sequence-specific labels on the polynucleotides, and determining the presence or absence of one or more patterns characteristic of one or more foreign elements on the polynucleotides, thus determining the presence or absence of one or more foreign elements in the biological sample. In some embodiments, the at least one pattern of sequence-specific labeling is selected to differentiate foreign element nucleic acid sequences from host nucleic acid sequences. In some embodiments, the at least one reference pattern of sequence-specific labeling is selected to comprise a label density of about 5 labels to about 20 labels per 100 kb. In some embodiments, the biological sample is enriched for possible foreign element nucleic acids In some embodiments, enriching comprises extracting host nucleic acids from the sample. In some embodiments, enriching comprises extracting foreign element nucleic acids so as to provide a sample enriched for foreign element nucleic acids. In some embodiments, enriching comprises substantially removing host polynucleotides from the sample. In some embodiments, the method further comprises aligning patterns of sequence-specific labels on the polynucleotides to patterns of a reference host genome, and determining any polynucleotides that fully align to the reference host genome to not comprise patterns characteristic of one or more foreign elements. In some embodiments, aligning all of the detected patterns to a patterns of a composite reference comprising a reference host genome and reference patterns of sequence-specific labeling of foreign element nucleic acid; and determining any polynucleotides that align to the reference patterns of sequence-specific labeling of foreign element nucleic acid to comprise patterns characteristic of one or more foreign elements. In some embodiments, the method further comprises estimating the fraction of the polynucleotides comprising foreign element nucleic acid. In some embodiments, the sample comprises a blood sample. In some embodiments, the host comprises a mammal. In some embodiments, the host comprises a human. In some embodiments, the at least one reference pattern of sequence-specific labeling of foreign element nucleic acid comprises at least one pattern specific to Human Immunodeficiency Virus 1, Human Immunodeficiency Virus 2, Human T-lymphocytotrophic Virus I, Human T-lymphocytotrophic Virus II, Hepatitis B, Hepatitis C, *Treponema pallidum* (Syphilis), West Nile virus, *Trypanosoma cruzi* (Chagas disease), Cytomegalovirus (CMV), or Malaria. In some embodiments, providing at least one reference pattern of sequence-specific labeling of foreign element nucleic acid comprises providing reference patterns of nucleic acid for at least three different foreign elements. In some embodiments, providing at least one reference pattern of sequence-specific labeling of foreign element nucleic acid comprises providing reference patterns of nucleic acid for at least ten different foreign elements. In some embodiments, the at least one reference pattern of sequence-specific labeling comprises an in silico pattern on a reference sequence. In some embodiments, the polynucleotide comprises at least one of a single-stranded DNA, single-stranded RNA, double-stranded DNA, or double-stranded RNA. In some embodiments, linearizing is performed in at least one nanochannel. In some embodiments, labeling comprises labeling with a nicking enzyme. In some embodiments, labeling comprises tagging with a non-cutting label. In some embodiments, the non-cutting label is applied by at least one of a methyltransferase, a non-cutting restriction enzyme, a zinc-finger protein, an antibody, a transcription factor, a DNA binding protein, a hairpin polyamide, a triplex-forming oligodeoxynucleotide, a peptide nucleic acid. In some embodiments, labeling comprises optical labeling. In some embodiments, labeling comprises non-optical labeling. In some embodiments, the foreign elements are pathogenic. In some embodiments, the foreign elements are bacterial foreign elements. In some embodiments, the foreign elements are viral foreign elements. In some embodiments, the foreign elements are parasitic foreign elements. In some embodiments, the biological sample is for donation.

In some aspects, a method detecting the presence or absence of one or more foreign elements in a subject is provided. The method can comprise providing at least one reference pattern of sequence-specific labeling of foreign element nucleic acid, collecting a biological sample from the subject, comprising a plurality of polynucleotides, labeling the polynucleotides of the biological sample in a sequence-specific manner to provide a pattern of sequence-specific first labels on a first polynucleotide, linearizing the polynucleotides following labeling, detecting patterns of sequence-specific labels on the polynucleotides, determining the presence or absence of one or more patterns characteristic of one or more foreign elements on the polynucleotides, thereby determining the presence or absence of one or more foreign elements in the biological sample, analyzing sequence patterns of sequence-specific labels of polynucleotides from the biological sample by aligning patterns of sequence-specific labels of polynucleotides from the biological sample to patterns of an in silico pattern on at least one reference sequence of foreign element nucleic acid, and determining the presence or absence of foreign elements in the subject based on the presence or absence of one or more pattern characteristics of the polynucleotides from the biological sample that is similar to the at least one reference sequence of foreign element nucleic acid, thereby determining the presence or absence of foreign elements in the subject. In some embodiments, the method comprises an in vitro method. In some embodiments, the foreign elements comprise one or more of Human Immunodeficiency Virus 1, Human Immunodeficiency Virus 2, Human T-lymphocytotrophic Virus I, Human T-lymphocytotrophic Virus II, Hepatitis B, Hepatitis C, West Nile virus, or Cytomegalovirus (CMV). In some embodiments, the at least one pattern of sequence-specific labeling is selected to differentiate foreign element nucleic acid sequences from host nucleic acid sequences. In some embodiments, the at least one pattern of sequence-specific labeling comprises a label density to differentiate foreign element nucleic acid sequences from host nucleic acid sequences. In some embodiments the at least one reference pattern of sequence-specific labeling is selected to comprise a label density of about 5 labels to about 20 labels per 100 kb. In some embodiments, the at least one reference pattern of sequence-specific labeling is selected to comprise a label density of about 10 labels per 100 kb. In some embodiments, the polynucleotides are enriched for possible foreign element nucleic acids. In some embodiments, enriching comprises substantially removing host polynucleotides from the sample. The method can further comprise aligning patterns of sequence-specific labels on the polynucleotides to patterns of a reference host genome, and determining any polynucleotides that fully align to the reference host genome to not comprise patterns characteristic of one or more foreign elements. The method can further comprise aligning all of the detected patterns to a pattern of a composite reference comprising a reference host genome and reference patterns of sequence-specific labeling of foreign element nucleic acid, and determining any polynucleotides that align to the reference patterns of sequence-specific labeling of foreign element nucleic acid to comprise patterns characteristic of one or more foreign elements. The method can further comprise aligning all of the detected patterns to a pattern of a composite reference comprising a reference host genome and reference patterns of sequence-specific labeling of foreign element nucleic acid, and determining any polynucleotides that align to the reference patterns of sequence-specific labeling of foreign element nucleic acid to comprise patterns characteristic of one or more foreign elements. The method can further comprise estimating the fraction of the polynucleotides comprising foreign element nucleic acid. In some embodiments, the sample comprises a blood sample. In some embodiments, the subject comprises a mammal. In some embodiments, the subject comprises a human. In some embodiments, the at least one reference pattern of sequence-specific labeling of foreign element nucleic acid comprises at least one pattern specific to Human Immunodeficiency Virus 1, Human Immunodeficiency Virus 2, Human T-lymphocytotrophic Virus I, Human T-lymphocytotrophic Virus II, Hepatitis B, Hepatitis C, *Treponema pallidum* (Syphilis), West Nile virus, *Trypanosoma cruzi* (Chagas disease), Cytomegalovirus (CMV), or Malaria. In some embodiments, the method comprises analyzing sequence patterns of sequence-specific labels of polynucleotides from the biological sample comprises aligning sequence patterns of sequence-specific labels of polynucleotides from the biological sample to patterns of an in silico reference patterns of nucleic acid for at least three different foreign elements. In some embodiments, analyzing comprises analyzing sequence patterns of sequence-specific labels of polynucleotides from the biological sample comprises aligning sequence patterns of sequence-specific labels of polynucleotides from the biological sample to patterns of an in silico reference patterns of nucleic acid for at least ten different foreign elements. In some embodiments, the at least one reference pattern of sequence-specific labeling comprises an in silico pattern on a reference sequence. In some embodiments, the polynucleotide comprises at least one of a single-stranded DNA, single-stranded RNA, double-stranded DNA, or double-stranded RNA. In some embodiments, linearizing is performed in at least one nanochannel. In some embodiments, wherein labeling comprises labeling with a nicking enzyme. In some embodiments, labeling comprises tagging with a non-cutting label. In some embodiments, wherein labeling comprises tagging with a non-cutting label, the non-cutting label is applied by at least one of a methyltransferase, a non-cutting restriction enzyme, a zinc-finger protein, an antibody, a transcription factor, a DNA binding protein, a hairpin polyamide, a triplex-forming oligodeoxynucleotide, a peptide nucleic acid. In some embodiments, the foreign element is pathogenic. In some embodiments, the foreign element comprises a virus. In some embodiments, the foreign element comprises a bacterium. In some embodiments, the foreign element comprises a parasite. In some embodiments, the foreign element comprises a pathogen. In some embodiments, detecting the presence or absence of one or more foreign elements further comprises analyzing label density of the polynucleotides from the biological sample to determine disease progression. In some embodiments, the biological sample is for donation.

In some aspects, a kit for determining the presence or absence of a foreign element in a subject is provided. The kit can comprise reagents for labeling nucleic acid of the foreign element at a label density to differentiate the foreign element nucleic acid sequences from host nucleic acid sequences. In some embodiments, the kit is for in vitro detection. In some embodiments, the kit comprises labeling reagents for labeling a plurality of foreign element genomes at a label density to differentiate the foreign element nucleic acid sequences from nucleic acid sequences of the subject's genome. In some embodiments, the reagents label the genome of the foreign element or foreign elements at a label density of about 1 label per 100 kb to about 50 labels per 100 kb. In some embodiments, the reagents label the genome of the foreign element or foreign elements at a label density of about 5 labels to about 20 labels per 100 kb. In some embodiments, the kit comprises the foreign element or foreign elements comprise one or more of: Human Immunodeficiency Virus 1, Human Immunodeficiency Virus 2, Human T-lymphocytotrophic Virus I, Human T-lymphocytotrophic Virus II, Hepatitis B, Hepatitis C, *Treponema pallidum* (Syphilis), West Nile virus, *Trypanosoma cruzi* (Chagas disease), Cytomegalovirus (CMV), or Malaria. In some embodiments, the kit further comprises reagents for isolating nucleic acid. In some embodiments, the kit further comprises reagents for enriching a sample from the subject for foreign element nucleic acids. In some embodiments, the kit further comprises reagents for linearizing a nucleic acid in a fluidic channel, for example a nanochannel.

BRIEF DESCRIPTION OF THE DRAWINGS

FIG. 1A illustrates flap generation according to some embodiments. FIG. 1B illustrates labeling of flaps according to some embodiments.

As shown in FIG. 6A, a signature of a retrovirus in a host genome was identified through site-specific labeling. Sequences containing the retroviral signature were aligned to each other, and showed a high degree of similarity to a retroviral signature that was determined in silico. As shown in FIG. 6B, retroviral copy number in the host genome was determined.

FIG. 7 is a flow diagram illustrating a method of characterizing a first polynucleotide integrated into a second polynucleotide in accordance with some embodiments herein.

FIG. 8 is a flow diagram illustrating a method of characterizing at least a first polynucleotide associated with a host genome in accordance with some embodiments herein.

FIG. 13 is a table depicting results of an in-silico study of foreign element genomes in accordance with some embodiments herein (characteristics of the foreign element genomes are also shown in FIG. 14). FP=false positive, FN=false negative, TP=true positive, TN=True negative.

FIG. 14 is a table of foreign element genomes used in a study in accordance with some embodiments herein.

DETAILED DESCRIPTION

Figure 1A:
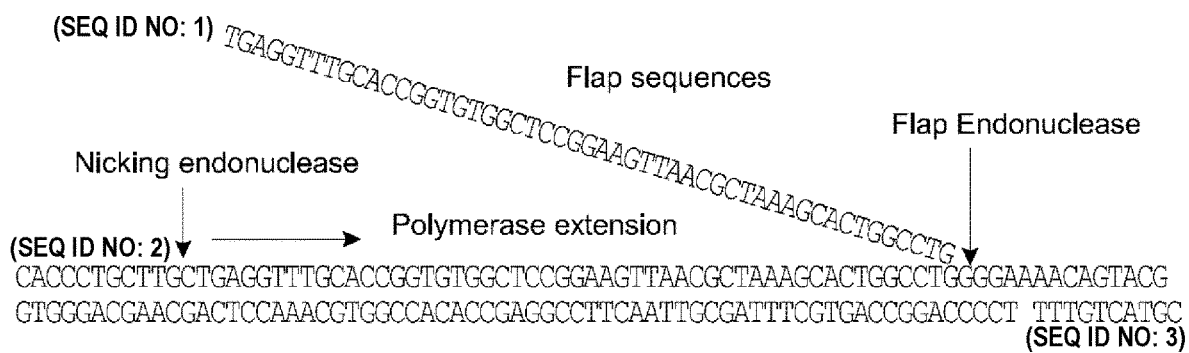
FIGS. 1A and 1B are schematic diagrams illustrating methods of labeling polynucleotides according to some embodiments.

Polynucleotide sequences that did not originate in the genome of a host organism can be associated with the host organism's genome through various mechanisms. According to some embodiments disclosed herein, one or more long fragments of polynucleotides of a host organism genome containing at least partially extragenomic elements can be labeled at specific sites and linearized, and a pattern of site-specific labeling can be identified. Patterns of site-specific labeling in a host polynucleotide containing such extragenomic elements can be compared to patterns of site-specific labeling of known extragenomic sequences, such as sequences of retroviruses, pathogenic bacteria, and parasitic pathogens. A pattern characteristic of an extragenomic sequence in the host polynucleotide can indicate the presence of the extragenomic element associated with the host organism and where and how they are inserted into the host genome. In some embodiments, extragenomic sequences associated with the host genome are identified de novo. In some embodiments, a host genome-associated extragenomic element is integrated into the host genome. Site-specific labeling of sequences flanking the host genome-associated extragenomic sequence can produce patterns on these flanking sequences. The presence of patterns on the flanking sequences characteristic of the host genome can indicate that the extragenomic sequence is integrated into the host genome, and can further be used to identify the site of integration. In some embodiments, the extragenomic element is not integrated into the host genome, but instead exists free of the host genome, for example embedded in an organelle, or in a minichromosome, episome, or plasmid. If site-specific labeling of the end sequences of a host-associated extragenomic element produces patterns that are not present in the host genome, but instead are characteristic of known extragenomic sequences and/or a consensus or "signature" pattern of the host-associated extragenomic sequence, the host-associated extragenomic sequence can be determined to exist free of the host genome. In some embodiments, the physical counts of at least one extragenomic sequence elements are quantitatively measured, in reference to the quantity counts of its host organism genome. In some embodiments, such extragenomic sequence elements are derived from host genome itself as a result of (and indicative of) abnormal host genome propagation.

As used herein "foreign element" refers to a genome-comprising element or organism of self-replication that did not originate in the genome of a host organism. Exemplary foreign elements include, but are not limited to micoorganisms, bacteria, fungi, viruses, viral elements, transposable elements, and the like. Foreign elements can be found associated with the genomes of host organism, and can exist free of the host genome and/or integrated into the host genome, depending on the particular foreign element. In some embodiments, a foreign element is parasitic. In some embodiments, a foreign element is pathogenic. In some embodiments, a foreign element is benign or beneficial to a host. Traditionally, detection of foreign element nucleic acid, such as viral, bacterial, yeast, and/or parasitic nucleic acid from a sample has relied on strategies such as immunological tests to screens that are based on PCR, and mass spectrometry based peptide finger printing. However, pitfalls to PCR based methods can include susceptibility of PCR to inhibitors, contamination, and other experimental conditions. This is in consideration of the sensitivity and the specificity of the PCR assay, which is largely dependent on target genes, primers, PCR techniques, and purity of the sample. PCR methods are also time consuming and expensive, requiring specific probe designs for targets as well as PCR optimization techniques. In regards to mass spectrometry-based fingerprinting, the skilled artisan will appreciate that typical mass spectrometry does not have great precision for a protein mixture analysis. Accordingly, in some embodiment, a sample is purified for proteins.

Labeling and Labels

In some embodiments, a polynucleotide, for example an RNA or DNA, is labeled by hybridizing a probe to a single strand of the polynucleotide. The probe can be complementary to a strand of the RNA or DNA or a portion thereof. In some embodiments, the probe is complementary to a specific sequence motif. In some embodiments, a plurality of probes is provided so as to be complementary to a plurality of specific sequence motifs, for example at least 2, 3, 4, 5, 6, 7, 8, 9, 10, 20, 30, 40, 50, 60, 70, 80, 90, 100, 200, 300, 400, 500, 600, 700, 800, 900, 1000, 5,000, or 10,000 probes, including ranges between any two of the listed values. In some embodiments, the probe has a random sequence. In some embodiments, a probe with a plurality of random sequences is provided.

In some embodiments, a double-stranded DNA is labeled by processing a double-stranded DNA comprising a first DNA strand and a second DNA strand to give rise to an unhybridized flap of the first DNA strand and a corresponding region on the second DNA strand, the unhybridized flap comprising from about 1 to about 1000 bases; extending the first DNA strand along the corresponding region of the second DNA strand; and labeling at least a portion of the unhybridized flap, a portion of the extended first DNA strand. Labeling can be suitably accomplished by (a) binding at least one complementary probe to at least a portion of an unhybridized flap, the probe comprising one or more tags, (b) utilizing, as a replacement base that is part of the first DNA strand extended along the corresponding region of the second DNA strand, a nucleotide comprising one or more tags, or any combination of (a) and (b). In this way, the flap, the bases that fill-in the gap, or both may be labeled.

In some embodiments, double-stranded DNA can be labeled by first nicking the first strand of double-stranded DNA. This nicking can be suitably effected at one or more sequence-specific locations, although the nicking can be effected at one or more non-specific locations, including random or non-specific locations. Nicking can be suitably accomplished by exposing the double-stranded DNA polymer to a nicking endonuclease, or nickase. Nickases are suitably highly sequence-specific, meaning that they bind to a particular sequence of bases (motif) with a high degree of specificity. Nickases are available, e.g., from New England BioLabs (accessible at on the world wide web at www dot neb dot com). Exemplary Nickases include, but are not limited to Nb.BbvCI; Nb.Bsml; Nb.BsrDI; Nb.BtsI; Nt.AlwI; Nt.BbvCI; Nt.BspQI; Nt.BstNBI; Nt.CviPII and combinations thereof. The nicking may also be accomplished by other enzymes that affect a break or cut in a strand of DNA. Such breaks or nicks can also be accomplished by exposure to electromagnetic radiation (e.g., UV light), one or more free radicals, and the like. Nicks may be affected by one or more of these techniques. In some embodiments, incorporation of replacement bases into the first strand (i.e., the nicked strand) of double-stranded DNA suitably comprises contacting DNA with a polymerase, one or more nucleotides, a ligase, or any combination thereof. In some embodiments, treating with a ligase following labeling of nicked DNA can restore the integrity of the dsDNA and significantly increase the strength of the resulting strand.

Labeling can also include methyltransferase labeling. M.Bsecl (methyltransferase), for example, can be useful as it is present at a low frequency in human genomes and is present at an acceptable frequency in microbial organisms and other lower eukaryotic pathogens. In some embodiments, the polynucleotide for labeling comprises at least one of a single-stranded DNA, single-stranded RNA, double-stranded DNA, or double-stranded RNA.

In some embodiments, double-stranded DNA can be labeled by first melting hydrogen bonds between double stands of certain genomic regions to open a so-called D-loop, by increasing temperature or manipulation with organic solvent, and then hybridizing to at least one specific probe with equal or higher affinity to single stranded regions before annealing back to relative stable form. As such, in some embodiments, double-stranded DNA can be labeled by a probe as described herein without nicking either strand. In some embodiments, a plurality of D-loops can be opened on a single strand. As such, a plurality of probes can be annealed to a particular double-stranded DNA.

In some embodiments herein, each label is independently selected from the group consisting of a fluorophore, a quantum dot, a dendrimer, a nanowire, a bead, a hapten, a streptavidin, an avidin, a neutravidin, a biotin, and a reactive group. In some embodiments herein, the first and second labels are independently selected from the group consisting of a fluorophore or a quantum dot. In some embodiments herein, at least one of the labels comprises a non-optical label. In some embodiments, two or more labels are the same. For example, if a first DNA is labeled and characterized, and a second DNA is labeled and characterized, the first DNA and second DNA can be labeled with the same type of label, for example the same fluorophore, same quantum dot, or same non-optical label. By way of example, the first DNA can be characterized in a first nanochannel, and the second DNA can be characterized in a second nanochannel, so the labeling patterns of the two DNAs can be distinguished, even if each DNA is labeled with the same labeling moiety. In some embodiments, the first label and second label are different, for example, if a single DNA is labeled at two or more different motifs.

In some embodiments, nick labeling is performed using a labeled nucleotide comprising a reversible terminator. A single reversible-terminator-comprising labeled nucleotide can be incorporated into a nick, so that no more than one label is incorporated into each nick. For example a linker connecting the nucleotide to the terminator can be cleaved. Following reversal of the terminator, the nick can be repaired. The label can then be detected, so as to detect a pattern of the first label on the DNA.

In some embodiments, at least one label as described herein comprises a non-optical label. A variety of non-optical labels can be used in conjunction with embodiments herein. In some embodiments a non-optical label comprises an electronic label. Exemplary electronic labels include, but are not limited to molecule with a strong electric charge, for example ions such as metal ions, charged amino acid side chains, or other cations or anions. An electronic label can be detected, for example, by conductivity (or resistivity) when the label is disposed in a detector. In some embodiments, a nanochannel comprises an electrode configured to determine the presence or absence of an electronic label by determining the conductivity or resistivity of a substance disposed in the channel. In some embodiments, the non-optical label comprises a metal, metal oxide (for example metal oxide), or silicon oxide moiety. In some embodiments, the non-optical label comprises a moiety (for example a nanoparticle) comprising a metal, metal oxide, or other oxide. The presence of a particular metal or oxide moiety can be detected, for example by nuclear magnetic resonance. In some embodiments, the label is configured to release a moiety, for example a proton or an anion, upon a certain condition (e.g. change of pH) and the presence or absence of released moiety is detected.

Nucleotides with reversible terminators can form a first phosphodiester linkage, but prior to reversal of termination, cannot form (or have limited capacity to form) a second phosphodiester linkage. Thus, a nucleotide with a reversible terminator can be incorporated into a polynucleotide (for example at a nick site), but the nucleotide cannot form downstream phosphodiester linkages until the terminator is reversed. Reversal can be performed using techniques known to one skilled in the art. For example, the terminator can be attached to the nucleotide via cleavable linker, which can be cleaved, for example, via electromagnetic radiation. If nick repair is performed using labeled nucleotides comprising a 3' reversible terminator, a single labeled nucleotide can be incorporated into the nick, but the terminator can prevent additional labeled nucleotides from being incorporated into the nick. Accordingly, nick labeling can be limited to one labeled nucleotide per nick. Limiting nick labeling to one label moiety per nick can minimize potential bias from multiple labels being incorporated into the same nick. For example, if approaches are taken to limit labeling to one label moiety per nick, two nicks that are very close together can be resolved based on a relatively strong signal from the label (i.e. the possibility that two labels simply got incorporated into the same nick can be ruled-out). For example, if quantitative estimates of the number of nicks are desired, a one-label-per-nick approach can facilitate direct correlation between strength of label signal and the number of nicks. The label on the nucleotide comprising a reversible terminator can be as described herein. In some embodiments, the nucleotide comprising a reversible terminator comprises a quantum dot. In some embodiments, the nucleotide comprising a reversible terminator comprises a fluorophore. In some embodiments, the nucleotide comprising a reversible terminator comprises a non-optical label.

A variety of species can serve as tags, which can be used in methods provided herein. A tag can include, for example, a fluorophore, a quantum dot, a dendrimer, a nanowire, a bead, a peptide, a protein, a magnetic bead, or a radiolabel. Various other materials can be used to label polynucleotide in a manner that does not cut the polynucleotide, including a labeled methyl group applied with a methyltransferase, a non-cutting restriction enzyme, a zinc-finger protein, an antibody, a transcription factor, a DNA binding protein, a hairpin polyamide, a triplex-forming oligodeoxynucleotide, a peptide nucleic acid, and the like. The methods can include the use of two or more different tags, and a single molecule may accordingly include multiple tags.

Probes can comprise nucleic acids (single or multiple) that include a tag, as described herein. In some embodiments, a probe is sequence-specific (e.g., AGGCT, or some other particular base sequence). In some embodiments, a probe is randomly generated. As described herein, a probe can be selected or constructed based on the user's desire to have the probe bind to a sequence of interest or, in one alternative, bind to a sequence that upstream or downstream from a sequence or other region of interest on a particular DNA polymer (i.e., probes that bind so as to flank or bracket a region of interest). A probe can be as long as a flap (i.e., up to about 1000 bases). A probe is suitably in the range of from 1 to about 500 bases in length, or from about 1 to 100 bases or from about 3 to 50 bases, or even in the range of from about 5 to about 20 bases in length. Probes can have a melting temperature of 66° C. to 75° C. Probes can have an annealing temperature of less than the melting temperature, for example at least about 1° C. less than the melting temperature, for example 1° C. less, 2° C. less, 3° C. less, 4° C. less, 5° C. less, 6° C. less, 7° C. less, 8° C. less, 9° C. less, 10° C. less, 11° C. less, 12° C. less, 13° C. less, 14° C. less, 15° C. less, 16° C. less, 17° C. less, 18° C. less, 19° C. less, or 20° C. less, including ranges between any two of the listed values.

Figure 2:
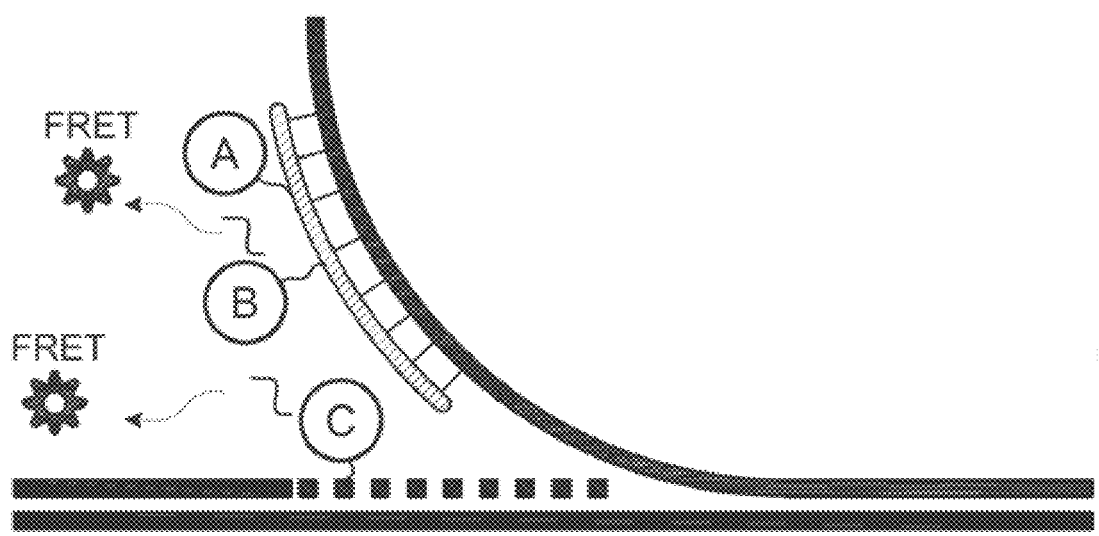
FIG. 2 is a schematic diagram illustrating methods of labeling polynucleotides according to some embodiments. A tagging agent, A, B, or C can be associated with the extended DNA during incorporation or hybridization; a colocalization event could be detected by a specific FRET signal.

In some embodiments, a probe includes one or more of an organic fluorophore, quantum dot, dendrimer, nanowires, bead, Au beads, paramagnetic beads, magnetic bead, a radiolabel, polystyrene bead, polyethylene bead, peptide, protein, haptens, antibodies, antigens, streptavidin, avidin, neutravidin, biotin, nucleotide, oligonucleotide, sequence specific binding factors such as engineered restriction enzymes, methyltransferases, zinc finger binding proteins, and the like. In some embodiments, the probe includes a fluorophore-quencher pair. One configuration of the probe can include a fluorophore attached to the first end of the probe, and an appropriate quencher tethered to the second end of the probe. As such, when the probe is unhybridized, the quencher can prevent the fluorophore from fluorescing, while when the probe is hybridized to a target sequence, the probe is linearized, thus distancing the quencher from the fluorophore and permitting the fluorophore to fluoresce when excited by an appropriate wavelength of electromagnetic radiation. In some embodiments, a first probe includes a first fluorophore of a FRET pair, and a second probe includes a second fluorophore of a FRET pair. As such, hybridization of the first probe and the second probe to a single flap, or to a pair of flaps within a FRET radius of each other can permit energy transfer by FRET. In some embodiments, a first probe includes a first fluorophore of a FRET pair, and a tag on a nucleotide incorporated to fill a corresponding gap can include a second fluorophore of a FRET pair. As such, hybridization of the first probe to a flap, and the tagged nucleotide into the corresponding gap can permit energy transfer by FRET. With reference to FIG. 2, a tagging agent A or B can be associated with the extended "flap" DNA during incorporation or hybridization. Tagging agent C can be associated with the DNA strand that is being extended. The co-localization event then can be detected by a specific FRET signal.

Figure 1B:
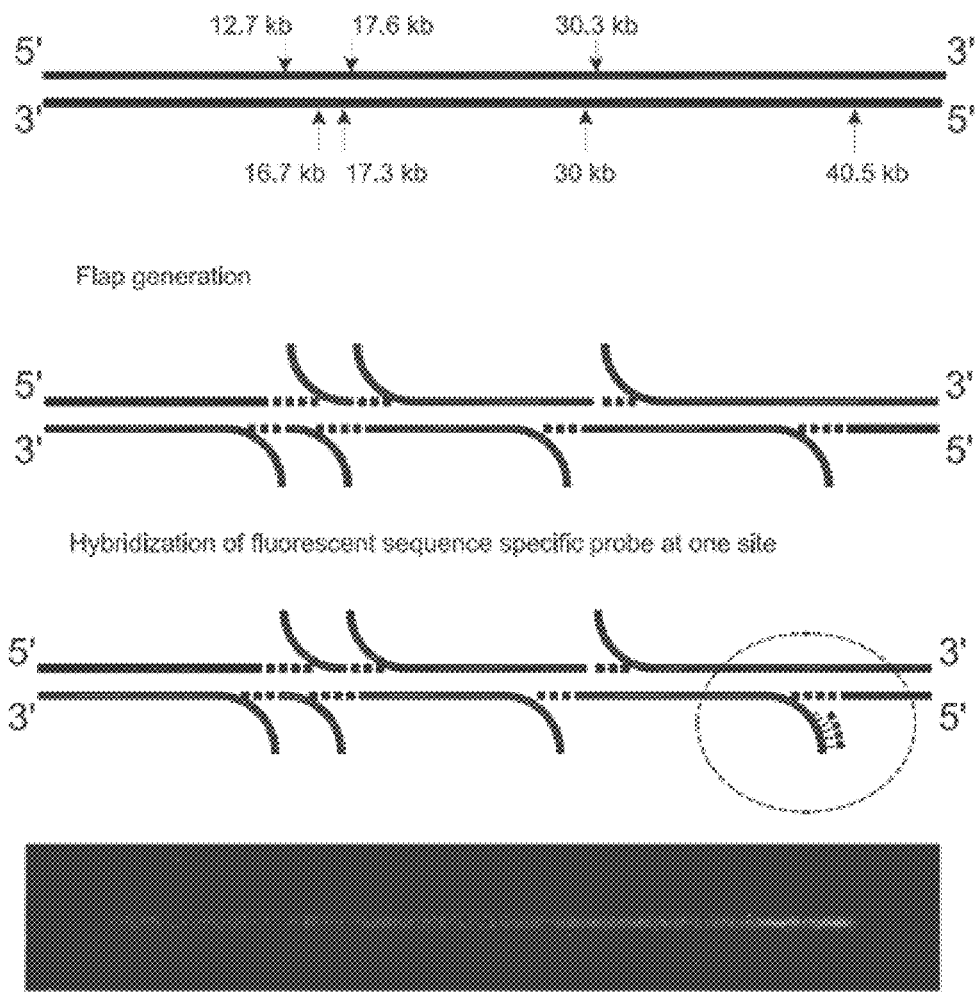

A schematic view of exemplary labeling methods is shown in FIGS. 1A and 1B. In FIG. 1A, the creation of a flap and the back-filling of the resulting gap is shown. In some embodiments, the gap is back-filled with radiolabeled nucleotides, so-called "hot" or labeled bases, and the flap can be contacted with one or more probes that are complementary to at least a portion of the flap. A sequence-specific nicking endonuclease, or nickase, creates a single strand cut gap on double stranded DNA, and a polymerase binds to the nicked site and starts strand extension while generating a displaced strand or so-called "peeled flap" simultaneously. The peeled flap then creates an available region (i.e., an unhybridized, corresponding region on the second DNA strand of the nucleic acid polymer) for sequencing specific hybridization with labeled probes to generate detectable and identifiable signals.

Figure 4:
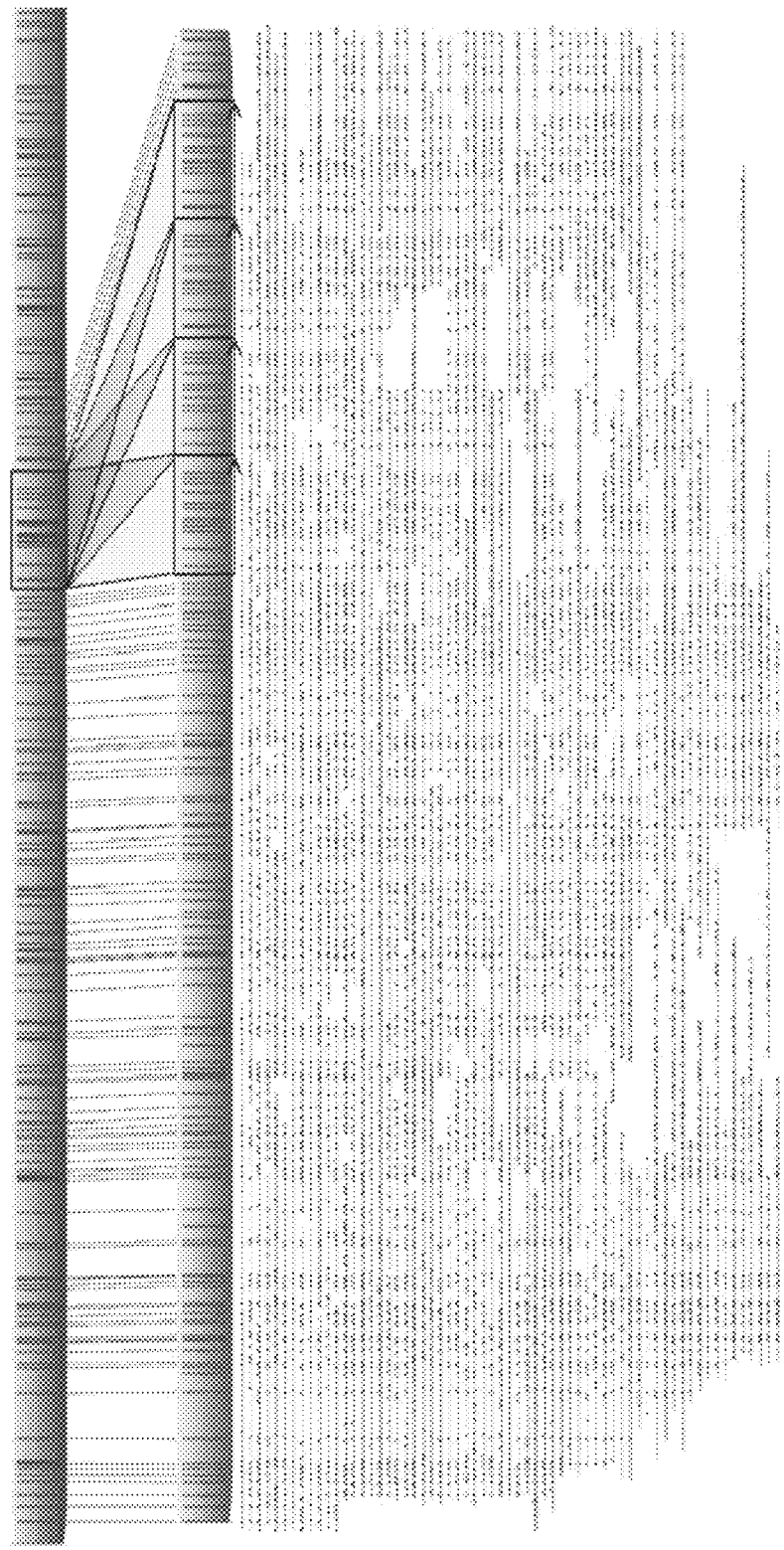
FIG. 4 is a schematic diagram illustrating aligned patterns of site-specific labeling within an assembled human genome map 30 and compared to a reference genome sequence 32 in accordance with some embodiments herein. A large tandem repeat (each unit 34 of the repeat is ~80 kb) was identified in chromosome 5 with strong single-molecule support.
Figure 5:
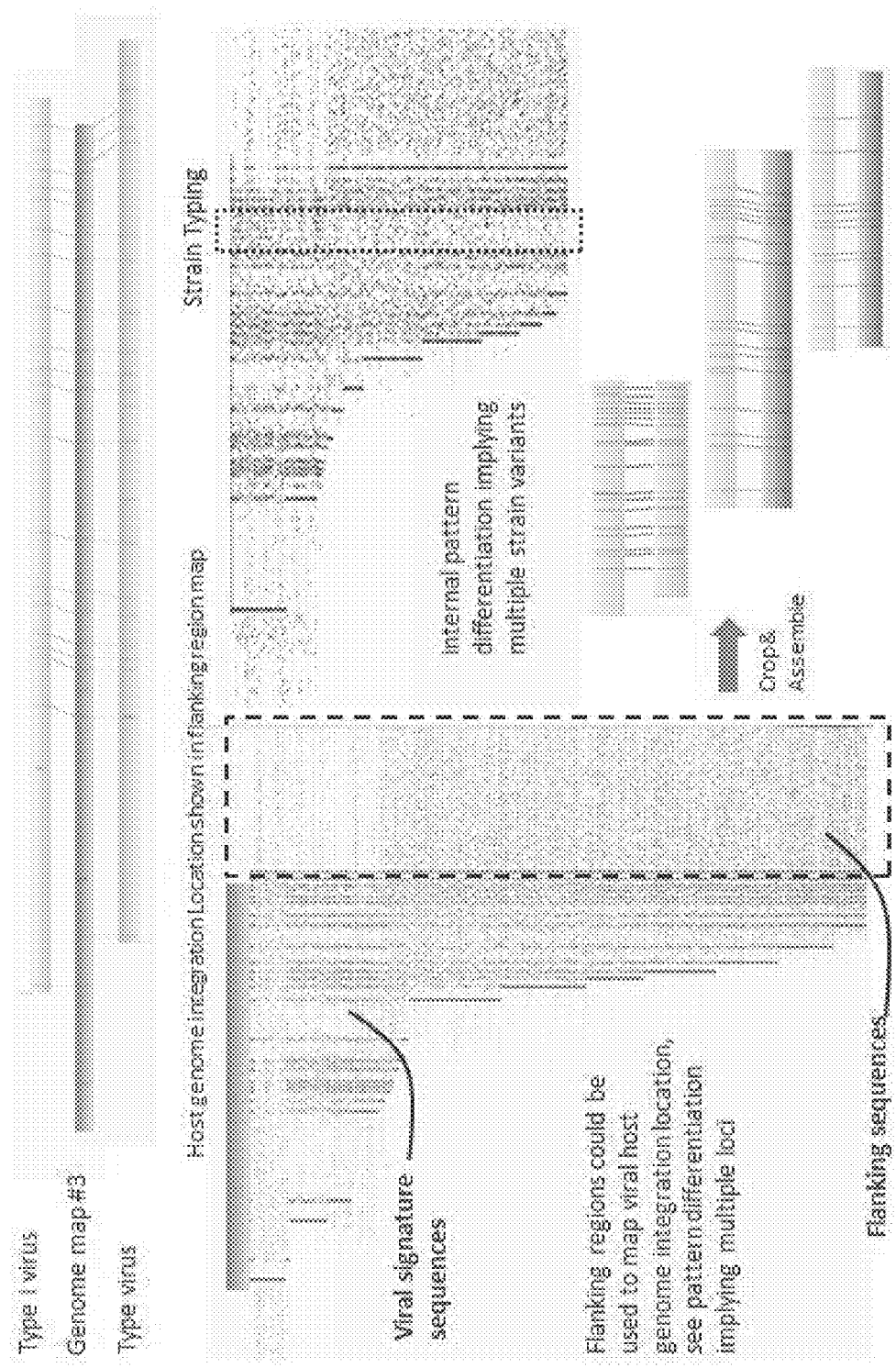
FIG. 5 is a schematic diagram illustrating aligned patterns of sequence-specific labels of Epstein-Barr virus sequences, as well as sequence-specific labels of host genomic sequence flanking Epstein-Barr virus sequences inserted in the host genome in accordance with some embodiments herein. Flanking sequences are shown in the dashed box. Internal pattern variation in viral sequences is shown in the dotted box.

FIG. 1B shows a labeled large genomic DNA being unfolded linearly within a nanochannel. As shown at the bottom of the figure, a fluorescently labeled flap enables the user to visualize the location of the probe within the larger context of the macromolecule. As shown, a nicked-labeled macromolecule may be linearized within a nanochannel. The spatial distance between signals from tags is consistent and can then be quantified, which in turn provides for a unique "barcoding" signature pattern that reflects specific genomic sequence information about the region under analysis. Multiple nicking sites on a lambda dsDNA (48.5 kbp total length) were shown as an example created by a specific enzyme, which can include but is not limited to Nb.BbvCI; Nb.Bsml; Nb.BsrDI; Nb.BtsI; Nt.AlwI; Nt.BbvCI; Nt.BspQI; Nt.BstNBI; Nt.CviPII and the combination digestion of any of above. A linearized single lambda DNA image is included to show a fluorescently labeled oligonucleotide probe hybridized to an expected nickase created location. Such recorded actual barcodes along long biopolymers are described elsewhere herein as observed barcodes. In some embodiments, by linearizing a macromolecule having labeled flaps, labeled gaps, or both, the user can determine the relative positions of the labels to one another. Reference is made to FIGS. 4, 5 and 6, which illustrate barcode signature patterns along the genomic sequence that is under analysis.

In some embodiments, methods are provided to mitigate fragile site-based fragmentation. In some embodiments, reduced driving conditions are used to limit the rate of incorporation of a label, and therefore minimize fragmentation at the fragile sites. In some embodiments, reduced driving conditions can minimize shearing stress forces associated with DNA elongation. In some embodiments, drive is reduced by lowering the concentration of dNTPs, lowering reaction temperature, lowering cofactor concentration, adjusting buffer and salt concentration, or a combination thereof. Drive can be also be reduced at the level of repair by stimulating the exonuclease activity of a polymerase with a high concentration of dNTPs, then limiting extension by restricting or omitting at least one nucleotide (which can be referred to as "choked repair"). In some embodiments, a single species of dNTP (e.g., dATP) is incorporated at the nick site, the flap is removed with a flap nuclease without extension, and ligation is performed.

In some embodiments, a suboptimal temperature for a thermophilic polymerase is used to reduce driving conditions. In some embodiments, the reaction temperature is about 35° C. to about 75° C., such as 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., or 75° C. In some embodiments, the temperature is between about 50° C. and about 55° C., between about 55° C. and about 60° C., between about 60° C. and about 65° C., or between about 50° C. and about 65° C.

In some embodiments, the polymerase used herein is thermostable. In some embodiments, the polymerase is mesophilic. In some embodiments, the polymerase does not have a proofreading capability. In some embodiments, the polymerase has a strand displacement capability. In some embodiments, the polymerase has a 5' to 3' exonuclease activity. In some embodiments, the polymerase does not have proofreading ability, but does have a strand-displacement capability and a 5' to 3' exonuclease activity.

In some embodiments, nickases that target the same sequence motif but nick at opposite strands are used to target specific DNA strands to minimize the formation of fragile sites. In some embodiments, nickases have been modified to only bind to one strand of a double-stranded DNA. In some embodiments, nickases are used to target a single strand from a first DNA molecule, and a single strand from a second DNA molecule. In some of these embodiments, a single strand from the first DNA is targeted by a first nickase, and the complementary strand from the second DNA molecule is targeted with a second nickase that recognizes the same sequence motif as the first nickase. In some embodiments, the orientation of extension is reversed for one of the strands. For example, in some embodiments, extension from the site of nicking occurs in one direction for a first DNA molecule, and in the opposite direction for a second DNA molecule. In some embodiments, extension from the site of nicking occurs in one direction for a top strand of a DNA molecule, and in the opposite direction for the bottom strand for the same DNA molecule.

In some embodiments, a second motif is investigated in a polynucleotide of interest. In some embodiments, the second motif includes at least one binding site for a binding entity selected from a non-cutting restriction enzyme, a zinc finger protein, an antibody, a transcription factor, a transcription activator like domain, a DNA binding protein, a polyamide, a triple helix forming oligonucleotide, and a peptide nucleic acid. In some embodiments, marking or tagging of the second motif is effected with a binding entity comprising a second label. In some embodiments, marking is performed with a label that does not cut or nick the DNA. In some embodiments, tagging is performed with a label that does not cut or nick the DNA.

In some embodiments, a first polynucleotide is labeled with a first label, and a second polynucleotide is labeled with a second label. In some embodiments, the first and second labels are the same. In some embodiments, the first and second labels are different. In some embodiments, a third polynucleotide is labeled with a third label. The third label can be the same as, or different from, either or both of the first and second label.

Linearization of Polynucleotides

In some embodiments, a polynucleotide is linearized. Means of linearizing a polynucleotide can include the use of sheer force of liquid flow, capillary flow, convective flow, an electrical field, a dielectric field, a thermal gradient, a magnetic field, combinations thereof (e.g., the use of physical confinement and an electrical field), or any other method known to one of skill in the art. In some embodiments, the channel(s) described herein have a cross sectional dimension in the micrometer range. In some embodiments, channels have a cross sectional dimension in the nanometer range. Examples of nanochannels and methods incorporating the use of nanochannels are provided in U.S. Publication Nos. 2011/0171634 and 2012/0237936, which are hereby incorporated by reference in their entireties.

In some embodiments, a nanochannel includes a substrate comprising at least one channel having a cross-sectional diameter in the range of from about 1 to about 500 nanometers. The channels suitably have a cross-sectional diameter in the range of from about 10 to about 200 nm, or from about 20 to about 100 nm, or even about 50 nm. The channels' depth may be in the same range as its width, although the width and depth of a particular channel need not be the same. Channels can be of virtually any length, from 10 nm up to centimeters. Such channels suitably have a length in the millimeter range, although the optimal length for a given application will be apparent to the user of ordinary skill in the art.

In some embodiments, a nanochannel includes an immobilization region. The immobilization region is capable of immobilizing a macromolecule. In some embodiments, the substrate comprises the immobilization region. In some embodiments, the immobilization region is configured for reversible attachment for at least one polynucleotide, for example via a magnetic field. In some embodiments, the immobilization region is configured for irreversible immobilization of at least one polynucleotide in the immobilization region. Without being bound by any particular theory, entropic equilibrium can be maintained for a polynucleotide in a nanochannel, so that the polynucleotide can undergo "linear immobilizing" while maintaining mobility. Accordingly, in some embodiments, the nanochannel is configured for "linear immobilizing" of at least one polynucleotide while maintaining mobility of the polynucleotide in the nanochannel. In some embodiments, the nanochannel does not comprise an immobilization region. In some embodiments, the nanochannel does not comprise an immobilization region, and is configured for "linear immobilizing" of at least one polynucleotide. In some embodiments, polynucleotides include one or more modifications, which can facilitate immobilization, and can include flaps, beads, dielectric modifications, magnetic particles, and the like. The systems and macromolecular modifications may be chosen in concert and on the basis of their affinity for one another. Exemplary immobilization regions include magnetic regions, chemically active regions, constrictions, and the like.

The polynucleotide described herein can be of any length for example at least about 0.1 Kb, for example, 0.1 Kb, 0.2 Kb, 0.3 Kb, 0.4 Kb, 0.5 Kb, 0.6 Kb, 0.7 Kb, 0.8 Kb, 0.9 Kb, 1 Kb, 2 Kb, 3 Kb, 4 Kb, 5 Kb, 6 Kb, 7 Kb, 8 Kb, 9 Kb, 10 Kb, 20 Kb, 30 Kb, 40 Kb, 50 Kb, 60 Kb, 70 Kb, 80 Kb, 90 kb, 100 Kb, 200 Kb, 300 Kb, 400 Kb, 500 Kb, 600 Kb, 700 Kb, 800 Kb, 900 Kb or 1000 Kb, including ranges between any two of the listed values. In some embodiments the polynucleotide described herein has a length of about 0.1 Kb-1000 Kb, 0.1 Kb-100 Kb, 0.1 Kb-10 Kb; 0.5 Kb-1000 Kb, 0.5 Kb-100 Kb, 0.5 Kb-10 Kb, 1 Kb-1000 Kb, 1 Kb-100 Kb, 1 Kb-10 Kb, 10 Kb-1000 Kb, or 10 Kb-100 Kb. In some embodiments the polynucleotide described herein has a length of about 3.3 Kb-170 Kb.

Maps

In some embodiments, a high-resolution physical map is constructed. The physical map can include the locations of labels on a polynucleotide being characterized, and distances (relative or absolute) between labels. The physical map can be used to validate or correct a physical map generated using another method, such as SNaPshot fingerprinting technology. In some embodiments, the physical map is used to validate assembled regions and correct inaccuracies in sequence scaffolds. In some embodiments, the physical map is used to facilitate de novo sequence assembly of a region by anchoring sequence scaffolds. In some embodiments, the physical map is used to produce a highly accurate and complete sequence assembly. In some embodiments, the physical map is used to compare multiple genomes to reveal sequence structural variations from different individuals or different parts of an individual or different time or stages of an organism or process intervening such as a drug treatment. In some embodiments, the physical map is used to detect the presence or absence of foreign elements in a biological sample. In some embodiments, the physical map is used to identify integration of a first polynucleotide into a second polynucleotide. In some embodiments, the physical map is used to identify integration of a viral polynucleotide into a host polynucleotide or presence. In some embodiments, the physical map is used to detect the presence or absence of a foreign element in a biological sample. In some embodiments, the physical map is used to detect the presence of a bacterium in a biological sample. In some embodiments, the physical map is used to detect the presence or absence of a virus in a biological sample. In some embodiments, the physical map is used to detect the presence or absence of a parasite in a biological sample. In some embodiments, the physical map is used to detect, in vitro, the presence or absence of a foreign element in a subject. In some embodiments, the physical map is used to detect, in vitro, the presence of a bacterium in a subject. In some embodiments, the physical map is used to detect in vitro, the presence or absence of a virus in a subject. In some embodiments, the physical map is used to detect in vitro, the presence or absence of a parasite in a subject.

In some embodiments, a reference map is used for identification of polynucleotide sequences that are not present in a host genome. In some embodiments, a reference map is provided by labeling at least one motif of at least one reference polynucleotide (for example, a control genomic sequence, such as a genomic sequence from a healthy organism or cell, an untreated organism or cell, or an outgroup) as described herein, and identifying labeled sites on the polynucleotide. As such, in some embodiments, the reference map is provided as a labeled molecule or collection of molecules. In some embodiments, the reference map is provided as an electronically or optically stored reference map, for example an image and/or data set. In some embodiments, a reference map is provided in silico by identifying on a reference sequence the motif or motifs used to label the polynucleotide being characterized. As such, the labeling pattern that would be produced on the reference sequence, if the reference sequence was labeled by process in-line with that of the polynucleotide being characterized, can be predicted. In some embodiments, a collection of reference maps is provided, for example a collection of reference maps of known foreign elements, such as viruses, bacteria, and/or fungi, implicated in interspecies or lateral gene transfer. In some embodiments, reference genomes for the foreign elements to be detected are obtained from available sequenced foreign element genomes, for example from the Sanger Institute protozoan genomes database, National Center for Biotechnology Information genome databases, TriTrypdDB database, or a combination of databases. Once a reference genome or genomes are obtained, labeling sites, for example nicking sites, methyltransferase target motifs, or probe annealing sites can be predicted with programs known to those skilled in the art. The labeling sites can be predicted within the relevant foreign element genomes for all enzymes currently used to label DNA for genomic mapping, and it can be determined whether there exists a labeling enzyme and/or probe sequence that can filter out host material. Preferably, candidate labeling enzymes or probes have low label density for the host genome, while having a label density of about 2 to about 50 labels per 100 kbp within the foreign element genome, for example about 5 to about 20 labels per 100 kbp, about 5 to about 10 labels per 100 kbp, about 10 to about 20 labels per 100 kbp within the foreign element genome. In some embodiments, the enzyme or probe has a label density of about 10 labels per 100 kbp within the foreign element genome. In some embodiments, the label density is about 5, 6, 7, 8, 9, 10, 11, 12, 13, 14, 15, 16, 17, 18, 19, or 20 labels per 100 kb within the foreign element geome. Such enzymes and/or probes are preferred to those that do not discriminate between human and foreign element material. For each labeling enzyme and/or probe, a reference map can be generated consisting of one foreign element genome or a set of contigs from multiple foreign element genomes. In some embodiments, the reference map is a pattern of sequence-specific labeling of foreign element nucleic acid comprising a pattern specific to bacterial foreign elements. In some embodiments, the reference map is a pattern of sequence-specific labeling of foreign element nucleic acid comprising a pattern specific to fungal foreign elements In some embodiments, the reference map is a pattern of sequence specific labeling of foreign element nucleic acid comprising a pattern specific to viruses. In some embodiments, the reference map is a pattern of sequence specific labeling of foreign element nucleic acid comprising a pattern specific to parasitic foreign elements. In some embodiments, the reference map is a pattern of sequence specific labeling of foreign element nucleic acid comprising a pattern specific to Human Immunodeficiency Virus I. In some embodiments, the reference map is a pattern of sequence specific labeling of foreign element nucleic acid comprising a pattern specific to Human Immunodeficiency Virus II. In some embodiments, the reference map is a pattern of sequence specific labeling of foreign element nucleic acid comprising a pattern specific to Human T-lymphocytotrophic Virus II. In some embodiments, the reference map is a pattern of sequence specific labeling of foreign element nucleic acid comprising a pattern specific to Hepatitis B. In some embodiments, the reference map is a pattern of sequence specific labeling of foreign element nucleic acid comprising a pattern specific to Hepatitis C. In some embodiments, the reference map is a pattern of sequence specific labeling of foreign element nucleic acid comprising a pattern specific to *Treponema pallidum*. In some embodiments, the reference map is a pattern of sequence specific labeling of foreign element nucleic acid comprising a pattern specific to West Nile Virus. In some embodiments, the reference map is a pattern of sequence specific labeling of foreign element nucleic acid comprising a pattern specific to *Trypanosoma cruzi*. In some embodiments, the reference map is a pattern of sequence specific labeling of foreign element nucleic acid comprising a pattern specific to Cytomegalovirus. In some embodiments, the reference map is a pattern of sequence specific labeling of foreign element nucleic acid comprising a pattern specific to Malaria.

Reference maps can be used in basic sequence alignments to determine the presence or absence of a foreign element in a subject in accordance with some embodiments herein. In some embodiments, detection of the presence of a polynucleotide labeling pattern that does not align to the map of a host is used to determine the presence of a foreign element in the subject. Alignments can also be performed in which labeling patterns from a labeled sample polynucleotide or collection of polynucleotides do not align to any labeling patterns of the host reference map, indicating that the second labeled polynucleotide or collection of polynucleotides do not have markers of the host genome. Alternatively or additionally, in some embodiments, the presence of a foreign element can be determined by aligning the labeling pattern to a sample polynucleotide or collection of polynucelotides to that of a foreign element map in which matches to the polynucleotide map of the foreign element can indicate the presence of a foreign element. Alignments can be performed by alignment programs that are well-known to those skilled in the art, and can include for example, DIALIGN, DIALIGN-TX, Kalign, Kalign-SBC, MAFFT-CBRC, MAFFT-EBI, MaxAlign, Multialin, MUSCLE, KBLAST, BLAT, BWA, BWA-SW, BWA-MEM, BFAST, Bowtie2, Novoalign, GSNAP, SHRiMP2, CLUSTALW, CLUSTALW-2, CLUSTALW-PBIL, RefAligner, and STAR. In some embodiments, a collection of reference maps is provided for screening a biological sample for the presence or absence of foreign elements. In some embodiments, the pathogen is a virus. In some embodiments, the foreign element is a bacteria. In some embodiments, the foreign element is a fungus. In some embodiments, the foreign element is a parasite. In some embodiments, the foreign element is pathogenic. In some embodiments, the foreign element is a species of *Plasmodium*. In some embodiments, the reference map is a pattern of sequence specific labeling of pathogen nucleic acid of one or more of Human Immunodeficiency Virus I. In some embodiments, the reference map is a pattern of sequence specific labeling of foreign element nucleic acid of Human Immunodeficiency Virus 2. In some embodiments, the reference map is a pattern of sequence specific labeling of foreign element nucleic acid of Human T-lymphocytotrophic Virus I. In some embodiments, the reference map is a pattern of sequence specific labeling of foreign element nucleic acid of Human T-lymphocytotrophic Virus II. In some embodiments, the reference map is a pattern of sequence specific labeling of foreign element nucleic acid of Hepatitis B. In some embodiments, the reference map is a pattern of sequence specific labeling of foreign element nucleic acid of Hepatitis C. In some embodiments, the reference map is a pattern of sequence specific labeling of foreign element nucleic acid of *Treponema pallidum* (Syphilis). In some embodiments, the reference map is a pattern of sequence specific labeling of foreign element nucleic acid of West Nile virus. In some embodiments, the reference map is a pattern of sequence specific labeling of foreign element nucleic acid of *Trypanosoma cruzi* (Chagas disease). In some embodiments, the reference map is a pattern of sequence specific labeling of foreign element nucleic acid of Cytomegalovirus (CMV). In some embodiments, the reference map is a pattern of sequence specific labeling of foreign element nucleic acid of *Plasmodium* (Malaria). In some embodiments, the foreign element is selected from Human Immunodeficiency Virus 1, Human Immunodeficiency Virus 2, Human T-lymphocytotrophic Virus I, Human T-lymphocytotrophic Virus II, Hepatitis B, Hepatitis C, *Treponema pallidum* (Syphilis), West Nile virus, *Trypanosoma cruzi* (Chagas disease), Cytomegalovirus (CMV), or *Plasmodium* (Malaria), or any combination of the listed items.

In some embodiments, a plurality of different motifs is labeled (for example by using a plurality of different labeling enzymes such as methyltransferases). In some embodiments, molecules nicked by a plurality of labeling enzymes (e.g. nickases) are assembled using a reference map. In some embodiments, more than one labeling step is used to maximize information density. In some embodiments, the molecule or molecules subjected to more than one labeling step are assembled using a reference map.

In some embodiments, the polynucleotide comprises DNA. In some embodiments, the polynucleotide comprises RNA. In some embodiments, the polynucleotide is double-stranded. In some embodiments, the polynucleotide is single-stranded. In some embodiments, the polynucleotide comprises a DNA-RNA hybrid.

The polynucleotide can be a highly pure preparation, crude, or semi-crude material. The polynucleotide can be isolated from other polynucleotides. The polynucleotide can come from any biological source or can be synthetic. In some embodiments, the polynucleotides are isolated from a biological sample. In some embodiments, the isolated polynucleotides are enriched for non-host polynucleotides, for example foreign element polynucleotides. In some embodiments, the enrichment comprises removal of host polynucleotides from the biological sample, while retaining at least host-associated foreign element polynucleotides and/or host-free foreign element polynucleotides. In some embodiments, host nucleic acids are extracted from a sample that also contains or possibly contains foreign element nucleic acids, so as to provide enrichment for foreign element polynucleotides. In some embodiments, foreign element nucleic acids are extracted from a sample that also contains or possible contains host nucleic acids. so as to provide enrichment for foreign element polynucleotides. In some embodiments, host nucleic acids are degraded, cleaved, or otherwise neutralized, while foreign element polynucleotides are preferentially not degraded, cleaved, or neutralized. In some embodiments (for example if the foreign element comprises an RNA genome and the host comprises a DNA genome), an exonuclease specific for host nucleic acid degrades host nucleic acid. In some embodiments, an exonuclease specific for a motif or epigenetic feature of a host genome degrades host nucleic acid.

As used herein, the term "polymerase" refers to any enzyme, naturally occurring or engineered, that is capable of incorporating native and modified nucleotides in a template dependent manner starting at a 3' hydroxyl end.

As used herein, the term "nicking endonuclease" refers to any enzyme, naturally occurring or engineered, that is capable of breaking a phosphodiester bond on a single DNA strand, leaving a 3'-hydroxyl at a defined sequence. Nicking endonucleases can be engineered by modifying restriction enzymes to eliminate cutting activity for one DNA strand, or produced by fusing a nicking subunit to a DNA binding domain, for example, zinc fingers and DNA recognition domains from transcription activator-like effectors.

Identification and Characterization of Extragenomic Elements

Some embodiments include methods of identifying and characterizing extragenomic elements. As used herein "extragenomic element" refers to a polynucleotide sequence that is derived from a source other than the host genome. Exemplary extragenomic elements include viral insertions into the host genome, genomic material of other organisms inserted by lateral or interspecies gene transfer into the host genome, genomic material of an organelle, minichromosomes, plasmids, and the like. In some embodiments, an extragenomic element comprises genomic material of a foreign element. In some embodiments, an extragenomic element comprises a complete genome of a foreign element. In some embodiments, an extragenomic element comprises a portion of a genome of a foreign element In some embodiments, the method includes identifying a known extragenomic element. The method can include performing site-specific labeling at least one polynucleotide from a host organism. The method can include linearizing the polynucleotide or polynucleotides. The method can include identifying a pattern of site-specific labeling on the polynucleotide or each of the polynucleotides. The method can include comparing the pattern of site specific labeling of the polynucleotide from the host organism to patterns of site-specific labeling on a plurality of reference sequences of known extragenomic polynucleotides. In some embodiments, polynucleotides of the reference sequences undergo site-specific labeling of the same specific sites as the polynucleotide(s) from the host organism to produce site-specific labels. In some embodiments, patterns of polynucleotide labeling of the reference sequences are provided in silico based on the motif of the site-specific labeling of the polynucleotide(s) from the host organism. In some embodiments, the reference sequences are not from the host organism. For example, if the host organism is a human, the reference sequences can include bacterial, fungal, parasitic, and/or viral sequences. In some embodiments, the reference sequence comprises a pattern specific to Human Immunodeficiency Virus 1, Human Immunodeficiency Virus 2, Human T-lymphotrophic Virus I, Human T-lymphocytotrophic Virus II, Hepatitis B, Hepatitis C, *Treponema pallidum* (Syphilis), West Nile virus, *Trypanosoma cruzi* (Chagas disease), Cytomegalovirus (CMV), or Malaria. Identity (determined, for example, through alignment of site-specific labeling patterns) can indicate the presence of extragenomic material in polynucleotide(s) from the host organism. Identity between extragenomic sequences of different polynucleotides can indicate possible sub-variants of the extragenomic material, for example multiple copies of a retrovirus, some of which have acquired mutations. Abundance of extragenomic elements can be inferred by the number of alignments to extragenomic sequences (per-base coverage depth) compared to the number of alignments to host sequences. In some embodiments, viral copy number in a host organism is determined. In some embodiments, viral elements are mapped in the host genome. In some embodiments, viral strain typing is determined.

In some embodiments, an insertion position of the extragenomic sequence in the host genome is identified. Site-specific labeling patterns of the sequences flanking the extragenomic sequence can be produced, and aligned with site-specific labeling patterns of a reference sequence from the host genome. Identity between a pattern of the flanking sequences and a region of the host genome can indicate an insertion site for the extragenomic sequence flanked by the flanking sequences. In some embodiments, insertion sites of a plurality of extragenomic elements in a host genome are identified, for example insertion sites of at least about 2, 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, or 1000 extragenomic elements, including ranges between any two of the listed values.

In some embodiments, the host organism is a mammal. In some embodiments, the host organism is a mouse. In some embodiments, the host organism is a human. In some embodiments, the host organism is a plant. In some embodiments, the host organism is a bacterium. In some embodiments, the extragenomic sequence is of a foreign element known to infect the host species. For example, a phage can infect a bacterium. For example, *A. tumefaciens* can infect a dicot plant.

In some embodiments, the method includes identifying de novo an extragenomic sequence associated with a host genome. Polynucleotides associated with the host genome can undergo site-specific labeling and linearization as described herein. In some embodiments, the site-specific labeling pattern of a plurality of polynucleotides associated with the host genome is compared to the site-specific labeling pattern of a reference sequence of the host genome, and an absence of similarity is determined. As such, the polynucleotides can be determined to include material that is extragenomic to the host genome. In some embodiments, the pattern of the reference sequence of the host genome is generated in silico, for example by identifying motifs in silico that would have been labeled by the site-specific labeling. In some embodiments, a polynucleotide comprising the reference sequence is labeled and linearized and patterns are detected as described herein. The method can include aligning the site-specific labeling patterns of the polynucleotides that include extragenomic sequences to identify one or more consensus "signature" patterns characteristic of the extragenomic sequences. In some embodiments, the site-specific labeling pattern of a single polynucleotide containing extragenomic sequences is compared to the alignment to determine whether the polynucleotide includes all or a portion of a consensus pattern which can be indicative of a consensus sequence (for example, multiple copies of a retrotransposon in a host genome). In some embodiments, a determination is made whether the polynucleotide includes material that is not characterized by the signature pattern, for example flanking sequences. In some embodiments, the flanking sequences are derived from the host genome, and thus do not include signature pattern. Instead, the flanking sequences can include patterns characteristic of a region of the host genome. Accordingly, alignment of site-specific labeling patterns on the flanking sequences can be used to determine a site at which the extragenomic sequence is integrated into the host genome. If a relatively long polynucleotide has inserted into at a position in a host genome, identification of the flanking sequences can include analysis of patterns of a single polynucleotide that includes the inserted polynucleotide and at least some flanking sequences. Accordingly, in some embodiments, a single polynucleotide that includes flanking sequences on each end is analyzed. In some embodiments, the single polynucleotide does not undergo shredding, shearing, or cutting, for example to maintain a single molecule that includes flanking sequences on each end as well as the inserted polynucleotide. In some embodiments, the single polynucleotide has a length of at least about 3.3 Kb, for example at least about 3.3 Kb, 3.5 Kb, 4 Kb, 5 Kb, 6 Kb, 7 Kb, 8 Kb, 9 Kb, 10 Kb, 15K, 20 Kb, 25K, 30 Kb, 35 Kb, 40 kb, 45 Kb, 50 kb, 60 Kb, 70 Kb, 80 Kb, 90 Kb, 100 Kb, 150 kb, 200 Kb, 250 Kb, 300 Kb, 350 Kb, 400 Kb, 450 Kb, 500 Kb, 600 Kb, 700 Kb, 800 Kb, 900 Kb, 1000 Kb, 1500 Kb, or 2000 Kb, including ranges between any two of the listed values. In some embodiments, junctions between the inserted polynucleotide and flanking sequences from the host genome are preserved in the polynucleotide being analyzed.

In some embodiments, sites of integration of an extragenomic sequence, for example a viral sequence, a parasitic sequence, or bacteria sequence are identified. In some embodiments, the identified sequence is from Human Immunodeficiency Virus 1, Human Immunodeficiency Virus 2, Human T-lymphocytotrophic Virus I, Human T-lymphocytotrophic Virus II, Hepatitis B, Hepatitis C, *Treponema pallidum* (Syphilis), West Nile virus, *Trypanosoma cruzi* (Chagas disease), Cytomegalovirus (CMV), or Malaria. Disruption of one or more host genomic locus can thus be inferred. In some embodiments, sites of integration in the host genome represent sequences for target integration. In some embodiments, the insertion site of each extragenomic sequence is determined as described herein. In some embodiments, a long-molecule genomic map of the host genome is prepared as described herein, and signatures of extragenomic sequences are identified at various positions in the host genome. In some embodiments, site-specific-labeled host genomic sequences are compared to a reference genomic sequence of the species of the host, for example a genome assembly in silico.

In some embodiments, a pattern of insertion sites of a particular extragenomic sequence or family of extragenomic sequences is determined as described herein. In some embodiments, an origin of a disease cell is determined. For example, a retrovirus sequence can integrate into a host genome and proliferate to additional locations in the host genome, but cannot readily be excised from the host genome. Accordingly, the accumulation of retroviral insertion sites can be indicative of a cell lineage and its state of transformation or genomic function alterations. In some embodiments, the pattern of accumulated insertion sites in two or more different cells can be used to identify a phylogenetic relationship between these cells. In some embodiments, a comparison is made to a pattern of a third cell, for example an outgroup. In some embodiments, one or more of the patterns is identified by site-specific labeling, linearization, and detection as described herein. In some embodiments, one or more of the patterns is identified in silico. In some embodiments, the two cells are from two different organisms of the same species. In some embodiments, the two cells are two cells of an organism of the same species. One cell can be from a first lineage, and one cell can be from a second lineage of a host organism.

In some embodiments, the cell is in a disease state. In some embodiments, the cell is a cancer cell. Viral delivery of oncogenes to a cell, and/or disruption of tumor suppressor genes in a cell by viral insertion can contribute to a cancer disease state. As such, in some embodiments, a pattern of retroviral integration sites in a cancer cell can not only be used to identify the cell's lineage, but also can identify functional changes to the cell that contribute to its cancer phenotype, or likelihood of developing a cancer phenotype. In some embodiments, a pattern of integration sites in a cancer cell and a healthy cell of the same host can be identified to estimate the likelihood that the healthy cell or its lineage will become cancerous. In some embodiments, the cancer cell comprises one or more genomic rearrangement, for example a deletion, duplication, insertion, inversion, and/or translocation. In some embodiments a pattern characteristic of a genomic rearrangement is used to determine a cell lineage of the cancer cell. In some embodiments a pattern characteristic of a genomic rearrangement is used to determine a phylogenetic relationship between a healthy cell and a cancer cell, for example to determine a risk of the healthy cell developing cancer.

In some embodiments at least one pattern characteristic of certain genomic rearrangement events is linked to a subset of a cell population in a heterogeneous population. Such specific patterns can be indicative at least one initial phase of primary cancerogenesis before at least one subset of cells gains a growth advantage during cancer progression and clonal expansion. As such, such specific patterns can delineate at least one underlying molecular mechanism characteristic of cancer genomes. In some embodiments, at least one profile of an initial phase of primary cancerogenesis is provided. Without being bound by any particular theory, a cell population that gives rise to primary cancerogenesis can be highly heterogeneous. As such, in some embodiments, the profile or profiles of initial cancerogenesis can indicate a high degree of heterogeneity in a cell population that gives rise to a cancer. In some embodiments, the ends of the extragenomic sequence align to the signature pattern. Accordingly, alignment of the ends of the extragenomic sequence to the signature pattern can indicate that the ends of the extragenomic sequence are free of the host genome. In some embodiments, abundance (relative and/or absolute copy number) of the extragenomic sequence is inferred by the number of alignments to non-human sequences (per-base coverage depth) compared to the number of alignments to human sequences.

In some embodiments, disease state in a host is determined by determining a presence or absence of a pattern of insertion sites of a particular extragenomic sequence or family of extragenomic sequences in a biological sample comprising a plurality of polynucleotides. In some embodiments, the host is a mammal. In some embodiments, the host is a human. In some embodiments, the biological sample is blood. In some embodiments, absence of a pattern characteristic of an extragenomic sequence of a foreign element indicates an absence of a disease. In some embodiments, presence of a pattern characteristic of an extragenomic sequence of a foreign element indicates a presence of a disease state. In some embodiments, the disease is a bacterial disease. In some embodiments the disease is a viral disease. In some embodiments the disease is a parasitic disease. In some embodiments, biological samples are provided to screen for the presence or absence of one or more foreign elements. In some embodiments at least one pattern characteristic of certain genomic rearrangement events is linked to bacterial disease. In some embodiments at least one pattern characteristic of certain genomic rearrangement events is linked to viral disease. In some embodiments at least one pattern characteristic of certain genomic rearrangement events is linked to parasitic disease. In some embodiments, the at least one pattern characteristic of genomic rearrangement events is linked to Human Immunodeficiency Virus 1, Human Immunodeficiency Virus 2, Human T-lymphocytotrophic Virus I, Human T-lymphocytotrophic Virus II, Hepatitis B, Hepatitis C, *Treponema pallidum* (Syphilis), West Nile virus, *Trypanosoma cruzi* (Chagas disease), Cytomegalovirus (CMV), or Malaria. As such, in some embodiments, the health profile of a host can be determined. In some embodiments, the ends of the extragenomic sequence align to the signature pattern. Accordingly, alignment of the ends of the extragenomic sequence to the signature pattern can indicate that the ends of the extragenomic sequence is free of the host genome. In some embodiments, abundance (relative and/or absolute copy number) of the extragenomic sequence is inferred by the number of alignments to non-human sequences (per-base coverage depth) compared to the number of alignments to human sequences.

FIG. 7 is a flow diagram illustrating a method for characterizing a first polynucleotide integrated into a second polynucleotide. The method can comprise labeling first polynucleotide in a sequence specific manner to provide a pattern of sequence-specific first labels on the first polynucleotide 110. The method can comprise labeling the second polynucleotide in a sequence-specific manner to provide a sequence-specific pattern of second labels on the second polynucleotide, wherein the first and second labels may be the same or different 120. The method can comprise linearizing the combined polynucleotide following labeling 130. The method can comprise detecting patterns of sequence specific labels on the first and second polynucleotides 140. The method can comprise identifying a first region of the combined polynucleotide as comprising the first polynucleotide based on a labeling pattern characteristic of the first polynucleotide 150. The method can comprise characterizing a labeling pattern of the second polynucleotide adjacent to the first polynucleotide to identify the location and orientation of integration of said first polynucleotide into said second polynucleotide labeling pattern characteristic of the first polynucleotide 160. One skilled in the art will appreciate that, for this and other processes and methods disclosed herein, the functions performed in the processes and methods may be implemented in differing order. Furthermore, the outlined steps are only provided as examples, and some of the steps and operations may be optional, combined into fewer steps and operations, or expanded into additional steps and operations without detracting from the essence of the disclosed embodiments.

In addition to identifying extragenomic sequences, methods described herein can identify the duplication, rearrangement, deletion, and/or deletion of sequences of a host genome. Accordingly, some embodiments include methods of identifying a chromosomal aberration in the host genome, such as a rearrangement, inversion, duplication, or deletion of genomic material in the host species. The method can include site-specific labeling of at least one polynucleotide can from a host organism, and linearizing the polynucleotide as described herein. The method can include identifying a pattern of site-specific labeling on the polynucleotide. The method can include comparing the pattern of the polynucleotide to at least a portion of a reference host genome. In some embodiments, a translocation, inversion, deletion, or duplication of a portion of the host genome is indicated by a pattern on the polynucleotide characteristic of break points (e.g. a first pattern of the host genome adjacent to a second pattern of the host genome on the polynucleotide, that are not adjacent to each other in the reference host genome). In some embodiments, a deletion or duplication is identified by quantifying the abundance (relative or absolute) copy number of at least a portion of the polynucleotide in comparison to a copy number of a corresponding sequence on the host genome. In some embodiments, a deletion or duplication is further characterized by determining the break points of the duplication or deletion, for example to determine the size of the deletion or duplication, and/or to determine whether a duplication is a tandem duplication or whether the duplication is positioned elsewhere in the genome. Exemplary identification of a tandem duplication is discussed in Example 2, and illustrated in FIG. 4.

In some embodiments a method of personalized cancer diagnostic and or prognostic is provided. Tumor DNA aberrations can be characterized with single-molecule sensitivity. Structural variation of tumor cells can be determined by dynamic imaging of single DNA molecules derived from a plurality of different cancer lines, for example three different cancer cell lines, using nano-channel chips and analyzers. In some embodiments, a genome wide survey of structural variations of cancer genomes of large population is performed.

FIG. 8 is a flow diagram illustrating a method of characterizing at least a first polynucleotide associated with a host genome. The method can comprise labeling the first polynucleotide in a sequence-specific manner to provide a pattern of sequence-specific first labels on the first polynucleotide 210. The method can comprise linearizing the first polynucleotide following labeling 220. The method can comprise detecting patterns of sequence-specific labels on the first polynucleotide 230. The method can comprise determining a presence or absence of the first polynucleotide in the host genome based on an absence of a pattern characteristic of the host genome on the first polynucleotide 240. One skilled in the art will appreciate that, for this and other processes and methods disclosed herein, the functions performed in the processes and methods may be implemented in differing order. Furthermore, the outlined steps are only provided as examples, and some of the steps and operations may be optional, combined into fewer steps and operations, or expanded into additional steps and operations without detracting from the essence of the disclosed embodiments.

In some embodiments, methods are provided for screening a biological sample for the presence or absence of one or more foreign elements. In some embodiments, the method comprises providing at least one reference pattern of sequence specific labeling of foreign element nucleic acids. In some embodiments, the method comprises providing a foreign element reference library of reference patterns of sequence specific labeling of foreign element nucleic acid sequences.

In some embodiments, methods are provided for diagnosing or monitoring viral infection, bacterial infection, fungal infection, parasitic infection, interspecies gene transfer, delivery of a gene therapy vector, or the like. The method can include performing site-specific labeling at least one polynucleotide from a host organism. The method can include linearizing the polynucleotide or polynucleotide. The method can include identifying a pattern of site-specific labeling on the polynucleotide or each of the polynucleotides. The method can include comparing the pattern of site specific labeling to patterns of site-specific labeling on a plurality of reference sequences of known extragenomic polynucleotides. In some embodiments, polynucleotides of the reference sequences undergo site-specific labeling of the same specific sites as the polynucleotide(s) from the host organism to produce site-specific labels. In some embodiments, viral infection is diagnosed by the presence or absence in the host genome of a sequence corresponding to a known virus. In some embodiments, viral insertion sites are determined. In some embodiments, viral delivery of a desired sequence is monitored, for example a therapeutic such as an RNAi construct, or a gene therapy construct. In some embodiments, interspecies gene transfer (e.g. *T. cruzi* to human or *Salmonella* to human) is monitored.

Identification of extragenomic sequences in a host genome can further include characterization of the origin of the extragenomic sequences. In some embodiments, identifying an extragenomic sequence associated with a host genome as described herein comprises identifying an interspecies DNA transfer event. Polynucleotides isolated from a host organism can be labeled site-specifically and linearized as described herein. Patterns within the polynucleotides corresponding to extragenomic elements can be determined as described herein. In some embodiments, the extragenomic element is inserted into the host genome. Based on a comparison of patterns of sequences flanking the extragenomic sequences, and patterns of a host genome reference sequence, the insertion site of a particular extragenomic sequence can be identified. In some embodiments, the extragenomic element is free of the host genome. Based on a comparison of patterns of end sequences of each polynucleotide to patterns of a consensus extragenomic sequence, a particular extragenomic can be identified as free of the host genome. An absence of flanking sequence patterns corresponding to a portion of the host genome can also identify the polynucleotide as free of the host genome. In some embodiments, the extragenomic sequence comprises a sequence of an invading species, for example a sequence of a bacteria. In some embodiments, the extragenomic sequence remains as an independent genomic component, associated with but not integrated (e.g. not covalently bonded) to the host genome. For example, the extragenomic sequence can be part of a plasmid or episome, or embedded in an organelle (e.g. mitochondria or chloroplast). In some embodiments, the pattern of the extragenomic sequence is compared to patterns of one or more reference sequences, and the origin of the extragenomic sequence is identified. In some embodiments, the extragenomic sequence originates from lateral gene transfer. In some embodiments, the extragenomic sequence originates from interspecies gene transfer.

Screening Biological Samples

Biological samples can include but are not limited to whole blood, bone marrow, organ tissue, plasma, bodily fluids, urine, saliva, and the like. Bodily fluid can include lymphatic fluid, cerebrospinal fluid, urine, saliva, and additional fluids identifiable by a skilled person. Screening of biological samples can be used to determine, for example, that donor tissues, organs, and blood are free of microbial, parasitic, and viral extragenomic material. Screening of biological samples can be used to determine foreign element contamination in biological samples for a blood bank. Detection can be used to prevent possible infectious agents that could be transmitted with transfusion, spread of disease, and in some cases could lead to severe sepsis, septic shock from contaminated donated material. Detection of a foreign element can prevent use of a donated biological sample and further donation by a subject that has a positively detected foreign element present in their biological sample. In some embodiments, a biological sample is screened for the presence or absence of one of more foreign elements. In some embodiments, a biological sample is screened for the presence or absence of one of more pathogenic foreign elements In some embodiments a biological sample is screened for the presence or absence of bacterial foreign elements. In some embodiments, a biological sample is screened for the presence or absence of viral foreign elements. In some embodiments, a biological sample is screened for the presence or absence of parasitic foreign elements. In some embodiments, the biological sample comprises blood. In some embodiments, the sample is for donation. In some embodiments, the method comprises providing at least one reference pattern of sequence-specific labeling of foreign element nucleic acid, providing a biological sample comprising a plurality of polynucleotides, isolating the plurality of polynucleotides, labeling the polynucleotides of the biological sample in a sequence-specific manner to provide a pattern of sequence-specific first labels on the first polynucleotide, linearizing the polynucleotides following labeling, detecting patterns of sequence-specific labels on the polynucleotides, and determining the presence or absence of one or more patterns characteristic of one or more foreign elements in the polynucleotides, thereby determining the presence or absence of one or more foreign elements in the biological sample. In some embodiments, the at least one pattern of sequence-specific labeling is selected to differentiate foreign element nucleic acid sequences from host nucleic acid sequences. In some embodiments, a label density is selected to differentiate patterns of foreign element nucleic acid sequences from those of host nucleic acid sequences. In some embodiments, the at least one reference pattern of sequence-specific labeling is selected to comprise a label density of about 5 labels to about 20 labels per 100 kb. In some embodiments, the at least one reference pattern of sequence-specific labeling is selected to comprise a label density of about 5 labels, about 10 labels, about 15 labels, about 20 labels per 100 kb, to about any amount of label density between these values.

Figure 9:
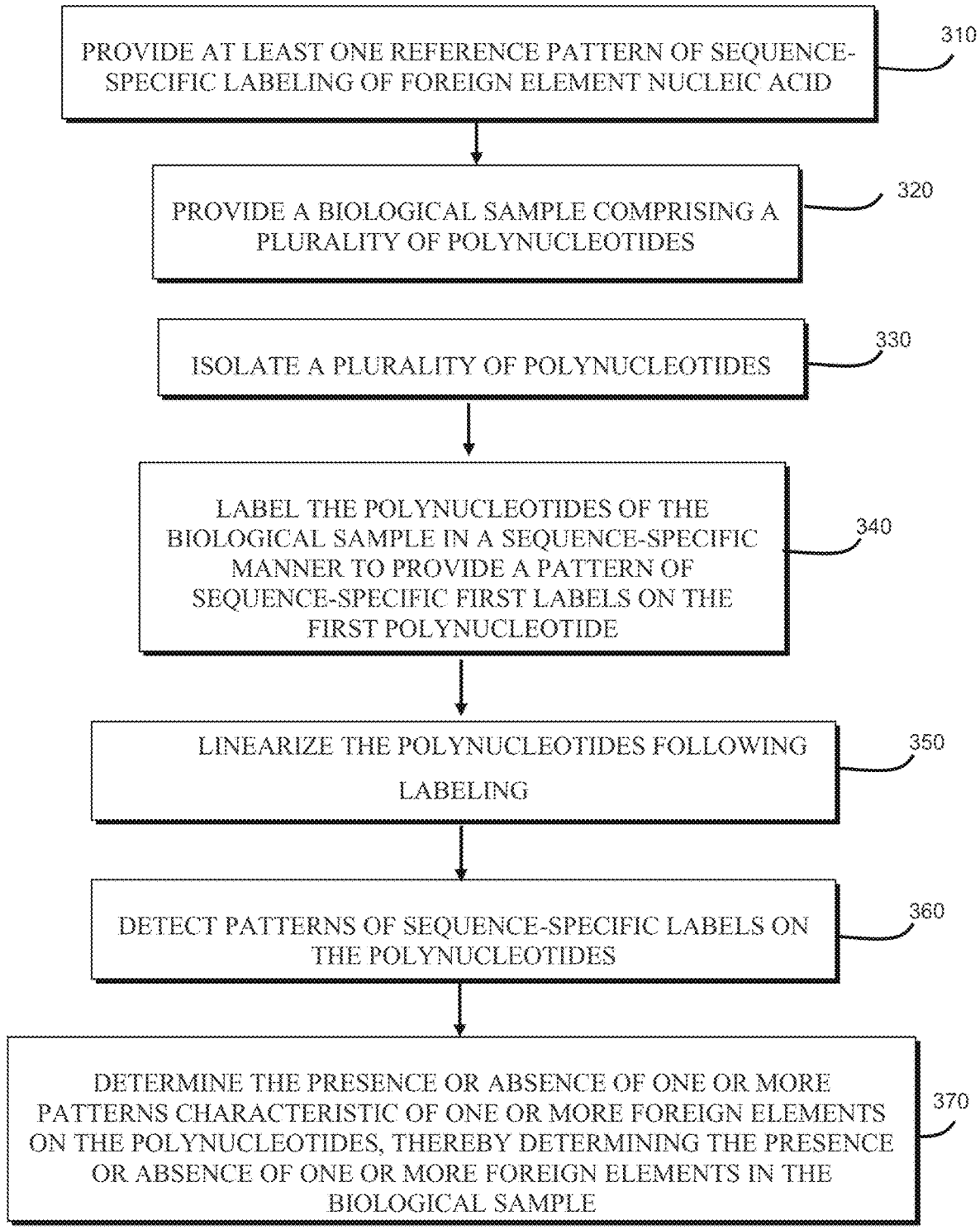
FIG. 9 is a flow diagram illustrating a method of screening a biological sample for the presence or absence of one or more foreign elements in accordance with some embodiments herein.

FIG. 9 is a flow diagram illustrating a method of screening a biological sample for the presence or absence of one or more foreign elements. The method can comprise providing at least one reference pattern of sequence-specific labeling of foreign element nucleic acid 310. The method can comprise providing a biological sample comprising a plurality of polynucleotides 320. The method can comprise isolating the plurality of polynucleotides 330. The method can comprise labeling the polynucleotides of the biological sample in a sequence-specific manner to provide a pattern of sequence-specific first labels on the first polynucleotide 340. The method can comprise linearizing the polynucleotides following labeling 350. The method can comprise detecting patterns of sequence-specific labels on the polynucleotides 360. The method can comprise determining the presence or absence of one or more patterns characteristic of one or more foreign elements on the polynucleotides, thereby determining the presence or absence of one or more foreign elements in the biological sample 370. One skilled in the art will appreciate that, for this and other processes and methods disclosed herein, the functions performed in the processes and methods may be implemented in differing order. Furthermore, the outlined steps are only provided as examples, and some of the steps and operations may be optional, combined into fewer steps and operations, or expanded into additional steps and operations without detracting from the essence of the disclosed embodiments.

Enriching Nucleic Acid Samples

Nucleic acid samples, for example DNA samples, derived from a host can contain both host and microbial nucleic acid. In the case of a viral infection, the nucleic acid samples derived from a host can contain both host and viral DNA. In the case of a bacterial infection, the nucleic acid samples derived from a host can contain both host and bacterial nucleic acid. A consequence of nucleic acid analysis to obtain a microbiome sample, or a viral nucleic acid sequence sample to can be a vast excess of host genome derived reads. In this case, microbial or viral nucleic acid can be separated from the host nucleic acid in order to obtain microbial or viral nucleic acid more suitable for efficient analysis or diagnosis.

Methods of detecting detect nucleic acid of a foreign element can be hampered by the vast amount of host genome derived readings. Typical methods to determine the presence of foreign element nucleic acid can include DNA sequencing and analysis to establish their identity, abundance and functional characteristics of their microbial community. However, libraries that are prepared from biological samples can contain mixtures of bacterial, viral, and a vast abundance of host genomic nucleic acid. A limitation of species identification of the viral or bacterial DNA, can be the presence of the large amounts of host genomic DNA. In order to determine microbial or viral DNA in a host sample, the sample can be enriched for the microbial or viral DNA. Enriching can be a useful step to enhance sensitivity of foreign element detection by minimizing for example, human DNA carry over contamination, as foreign elements are expected to occur at a low frequency in blood (few-several entities per ml of blood). Accordingly, milliliter amounts of blood can be processed for reliable detection of foreign elements. Average human DNA content per ml healthy blood is ~35 ug with a range of 20-70 ug, easily drowns the few/several foreign element genomes (picogram amount) if not substantially removed.

An approach to selectively enriching microbial nucleic acid from methylated host DNA, can be performed by methods to remove host DNA from bacterial DNA due to differences in CpG methylation density. In this case, methyl-CpG binding domain (MBD) can be used to separate methylated host DNA from microbial DNA, using MBD fused to a Fc region of a human antibody, which can bind strongly to protein A magnetic beads. This technique is an effective one step enrichment method that can be used to remove host DNA from bacterial DNA for analysis and is described in Feehery, G. R. (2013) *PLOS ONE*. Vol 8: 1-13, which is hereby incorporated by reference in its entirety.

In some embodiments, a method of screening a biological sample further comprises enriching the sample for possible foreign element nucleic acids. In some embodiments, enriching comprises substantially removing host polynucleotides from the sample. Labeling can then be performed, and comprise one or more or nick labeling, tagging with a non-cutting label (e.g. labeling with methyltransferase, a non-cutting restriction enzyme, a zinc-finger protein, an antibody, a transcription factor, a DNA binding protein, a hairpin polyamide, a triplex-forming oligodeoxynucleotide, or a peptide nucleic acid), and/or labeling with a probe.

Determining the Presence or Absence of a Foreign Elements in a Subject

In some embodiments, methods for screening a biological sample for the presence or absence of one or more foreign elements are provided. Markers for the presence or absence of foreign elements can for can be used for future personalized care of the host, or lead to prevention of donation of biological samples from a subject suffering from a disease state. For example at donation sites such as a Blood Bank, biological samples can be tested for the presence of parasitic foreign elements. Exemplary parasitic foreign elements include, but are not limited to *Trypanasoma cruzi, Trapanosoma brucei, Trepenema pallidum, Leishmania, Plasmodium, Apicomplexa*, and *Trypanosoma specii*. In some embodiments, the disease is a viral disease. In some embodiments, the disease is a bacterial disease. In some embodiments, the disease is a parasitic disease. By way of example, and not of limitation, diseases can include Human Immunodeficiency virus (HIV-1, HIV-2), Hepatitis B, Hepatitis C, Human T-lymphocytotrophic Virus (HTLV-1/II), Cytomegalovirus, Syphilis, West Nile virus, Malaria, and Chagas disease.

Figure 12:
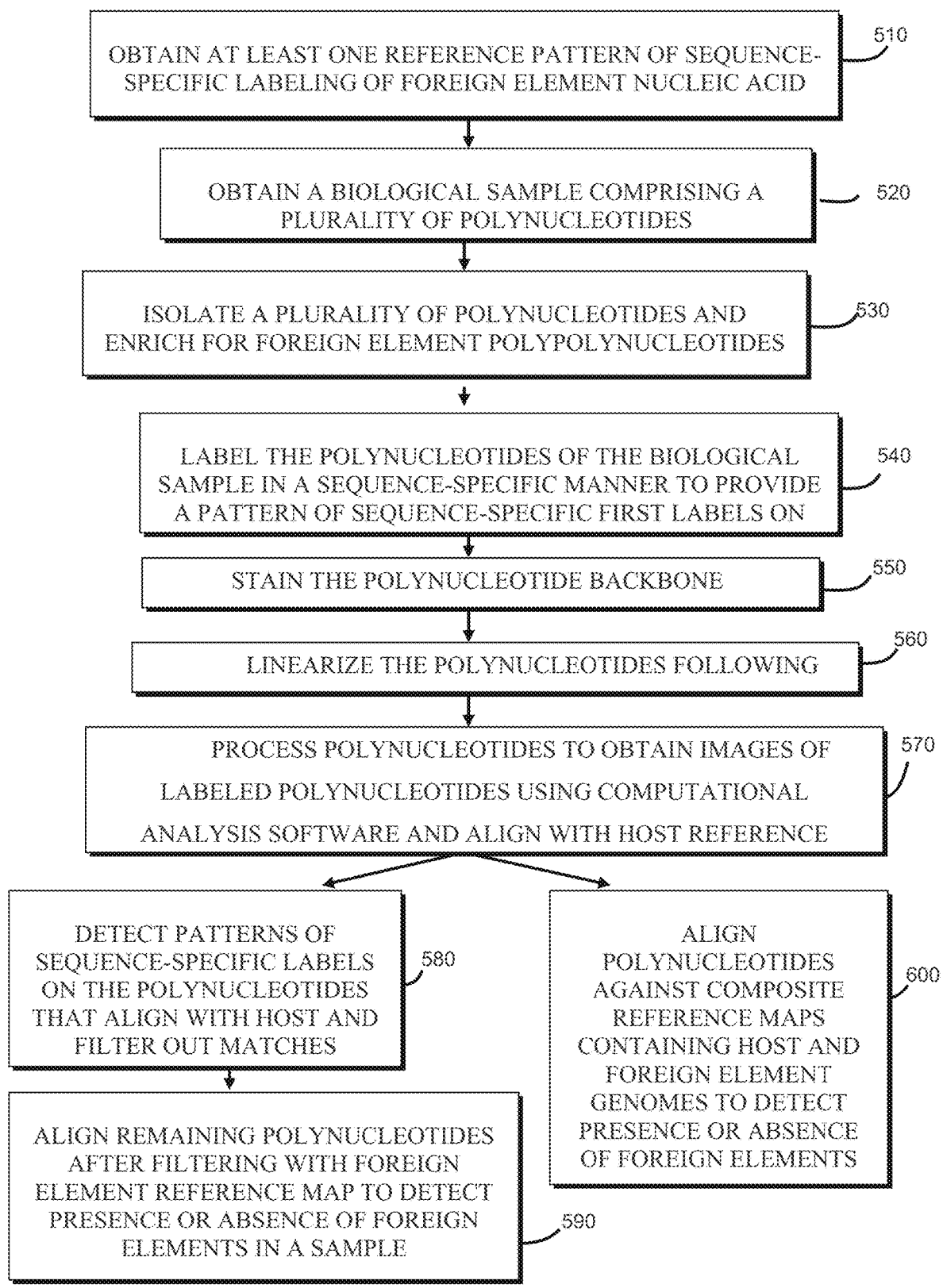
FIG. 12 is a flow diagram illustrating an example of preparing a sample for analysis of the presence or absence of foreign elements in a biological sample in accordance with some embodiments herein.

Reference is made to FIG. 12, a flow diagram illustrating a method for determining the presence of one of more foreign elements in a sample in accordance with some embodiments herein. Once a map is obtained of the reference genomes of the foreign elements 510, a biological sample can be obtained from a human or other mammalian donor in order to detect the presence or absence of foreign elements in a host mammal 520. The polynucleotides can be isolated from the biological sample and enriched for foreign element associated polynucleotides by removing interfering host genomic material 530. The enriched sequence can then be labeled for mapping purposes for example such as nick based labeling, methyltransferase based labeling, or by the use of probes comprising fluorophore, a quantum dot, a dendrimer, a nanowire, a bead, a hapten, a streptavidin, an avidin, a neutravidin, a biotin, a reactive group, or other means of labeling techniques for mapping purposes that are known to those skilled in the art 540. The backbone can then be stained with a intercalating fluorescent dye for nucleic acid such as YOYO-1, YO-PRO-1, TOTO-1, TO-PRO-1, PicoGreen™ dye, or SYBR™ green, for example 550. Nucleic acid can then be linearized within a nanochannel, for example within a system such as an IRYS® system. In particular, a voltage can be applied to the nucleic acids to concentrate the nucleic acid at the entrance of the channel, and an increase in voltage can be applied in order to move the nucleic acids into the nanochannels, and distribute the nucleic acids into the channels. Once inside the nanochannels, the nucleic acid can be stationary and stretched uniformly 560. Images of the nucleic acids can be processed, for example, with an associated program with the nanochannel such as IrysView 570. High resolution single molecule images of the labeled nucleic acid that contains sequence motifs along hundreds of kilobases to longer than a kilobase in a single contiguous molecule can then be generated. The images can then be processed and digital representation of the relative label locations in the observed nucleic acid can be generated. The generated map can then be used to determine if markers in the human or mammalian host genome match can match in an alignment with the generated map of the enriched sequence to determine if the generated map is a sequence not belonging to the host. For example, all of the molecules of the sample can be aligned against a host genome reference map. In some embodiments, the host genome reference map comprises one or more labeled molecules of the host genome. In some embodiments, the host genome reference map comprises an in silico generated map. In some embodiments, the host genome reference map is optically or electronically stored. Molecules that can successfully align to the host reference can be filtered out, while keeping the outliers, which, without being limited by any theory, likely originate from foreign elements 580. After a filtering step is performed, the remaining unfiltered molecules can be aligned against foreign element reference maps with a program for alignment such as RefAligner for example 590. However, if no filtering is performed, molecules can be aligned against a composite reference containing both the entire host genome and the mixture of foreign element genomes 560. In some embodiments, successful alignment of any molecules to the foreign element reference indicates possible presence of foreign element DNA in the sample. Optionally, normalization techniques can be performed with respect to the total number of reads aligned to the host reference to yield an estimate of the fraction of foreign element material in the sample. Based on the variability observed in multiple controls and variation of samples containing different concentrations of host and foreign element nucleic acids, the limit of detection, limit of quantification, and the calibration parameters for estimating the fraction of the foreign element DNA can be determined. If the amount of observed DNA mapping to the foreign element reference significantly exceeds the limit of detection, the sample can be classified as infected or foreign element-free. However, depending on the intrinsic variability, logistic regression to classify a sample as infected or foreign element-free can be performed. Depending on the intrinsic variability, a gray zone for the classification can also be provided. For samples in the grey zone of classification, no calls will be made for the samples in the gray zone, such as the sample being determined as foreign element-free or comprising a foreign element. Optionally, samples that fall in the gray zone can be rerun, or more samples can be collected. In some embodiments, a probability is associated that each foreign element species under consideration is present in the sample. Depending on whether the probability exceeds a predefined confidence level, the sample can be classified as infected or foreign element-free.

In some embodiments, a single panel containing multiple tests for multiple foreign element organisms is provided. In some embodiments, the panel comprises tests for at least two foreign elements, for example 2, 3, 4, 5, 6, 7, 8, 9, 10, 15, 20, 25, 30, 35, 40, 45, 50, 55, 60, 65, 70, 7, 80, 85, 90, 95, 100, 150, 200, 250, 300, 350, 400, 450, or 500 foreign elements, including ranges between any two of the listed values. The speed, ease of sample preparation, and cost of the assay can be improved by performing multiple tests in a single mixture, prepared with a single nicking enzyme, and additionally, different nicking enzymes for different foreign elements can also be used.

Patterns of site-specific labeling on extragenomic sequences and/or sites of insertion in a host genome can be used for a variety of applications. Some embodiments include determining the copy number of an extragenomic sequence. In some embodiments, viral loads in a host genome are measured. Some embodiments include monitoring the status of viral vector integration into a host genome. In some embodiments, gene transfer treatments, and/or viral delivery of therapeutics are monitored. Some embodiments are used in conjunction with gene therapy (e.g. gene replacement therapy), or antisense therapy, for example as a monitoring tool, or to improve the accuracy or efficiency of the therapy, for example by identifying target regions of a host genome, or selecting for desired transformants. In some embodiments, function of genetic regulatory elements, for example of gene products, promoters, or siRNAs, is characterized. In some embodiments, sites of integration of extragenomic elements are identified for use as actionable diagnostic or therapeutic biomarker or drug target regions. In some embodiments, viral infection is diagnosed. In some embodiments, strains and/or substrains of infecting virus are identified. In some embodiments, viral load of one or more strains and/or substrains is measured. In some embodiments, bacterial infection is diagnosed. In some embodiments, a parasitic infection is diagnosed. In some embodiments, direct structural mapping of cancer cells is performed via a long-molecule Genome Map. In some embodiments, comparative alignments are made with a known sequence or map reference. In some embodiments, a disease origin is determined, for example via analysis of integration sites in viral cancers. In some embodiments, sequences involved in target integration are identified, and can be used as drug therapy targets. In some embodiments, phylogenetic relationships between two extragenomic sequences can be determined. In some embodiments, phylogenetic relationships between two different host cells can be determined. In some embodiments, viral infection, development of cancer, or integration of gene therapy sequences into a patient genome can be monitored. In some embodiments, a bacterial infection can be monitored. In some embodiments, a parasitic infection can be monitored.

Figure 10:
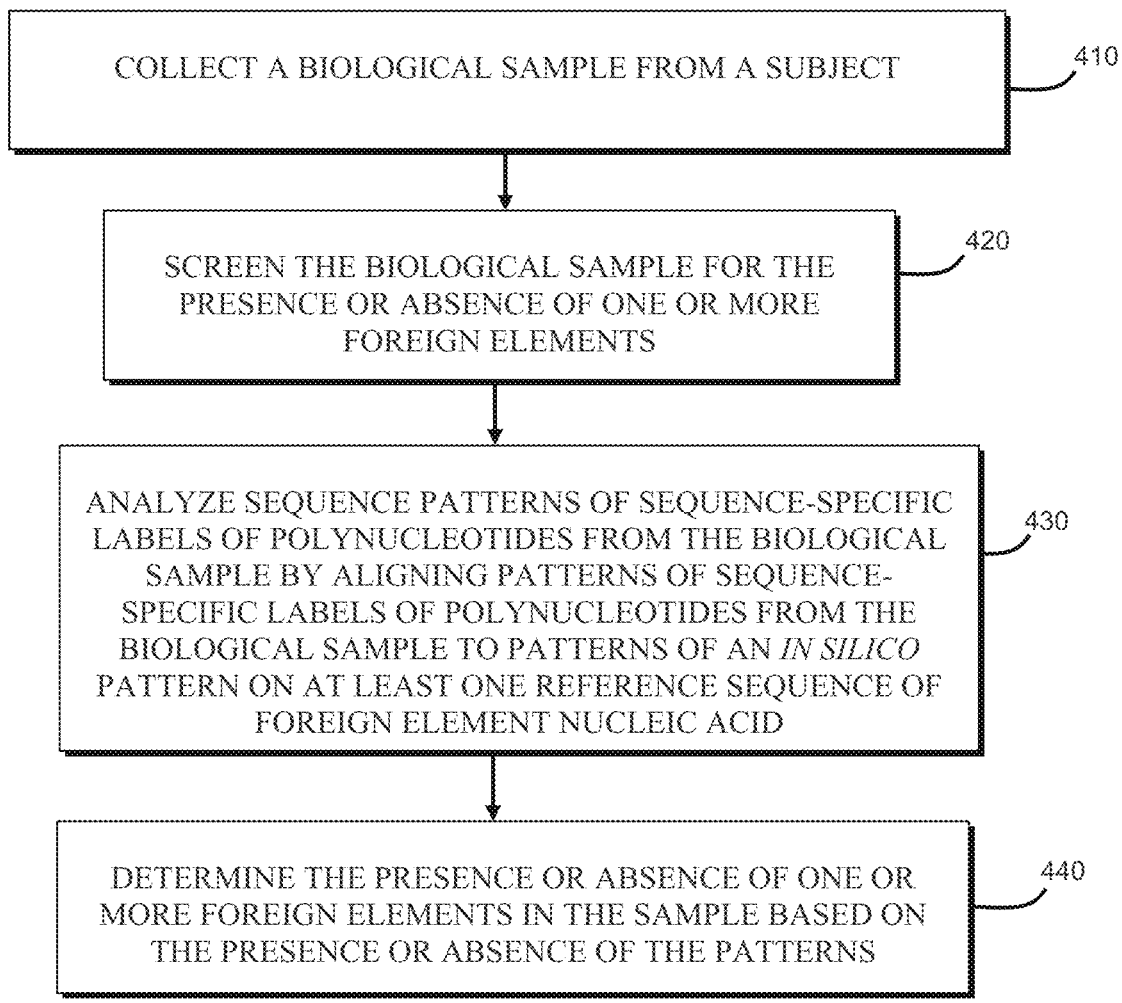
FIG. 10 is a flow diagram illustrating a method of determining the presence or absence of one of more foreign elements in a subject in accordance with some embodiments herein.

FIG. 10 is a flow diagram illustrating a method of screening a biological sample for the presence or absence of one or more foreign elements. The method can comprise collecting a biological sample from the subject 410. The method can comprise screening the biological sample for the presence or absence of one or more foreign elements 420. The method can comprise analyzing sequence patterns of sequence-specific labels of polynucleotides from the biological sample by aligning patterns of sequence-specific labels of polynucleotides from the biological sample to patterns of an in silico pattern on at least one reference sequence of foreign element nucleic acid 430. The method can comprise determining the presence of absence of one or more foreign elements in the sample based on the presence or absence of the patterns 440. One skilled in the art will appreciate that, for this and other processes and methods disclosed herein, the functions performed in the processes and methods may be implemented in differing order. Furthermore, the outlined steps are only provided as examples, and some of the steps and operations may be optional, combined into fewer steps and operations, or expanded into additional steps and operations without detracting from the essence of the disclosed embodiments.

Computer Systems and Computer-Implemented Techniques

Techniques described according to some embodiments herein, or portions of these techniques may be implemented in hardware, software, firmware, or combinations thereof. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

Methods according to some embodiments herein or portions of these methods can be implemented on any conventional host computer system, such as those based on Intel® or AMD® microprocessors and running Microsoft Windows operating systems. Other systems, such as those using the UNIX or LINUX operating system and based on IBM®, DEC® or Motorola® microprocessors are also contemplated. The systems and methods described herein can also be implemented to run on client-server systems and wide-area networks, such as the Internet.

Software to implement a method or model or portion thereof according to some embodiments herein can be written in any well-known computer language, such as Java, C, C++, Visual Basic, FORTRAN or COBOL and compiled using any well-known compatible compiler. The software according to some embodiments normally runs from instructions stored in a memory on a host computer system. A memory or computer readable medium can be a hard disk, floppy disc, compact disc, DVD, magneto-optical disc, Random Access Memory, Read Only Memory or Flash Memory. The memory or computer readable medium used in accordance with embodiments herein can be contained within a single computer or distributed in a network. A network can be any of a number of conventional network systems known in the art such as a local area network (LAN) or a wide area network (WAN). Client-server environments, database servers and networks that can be used in the accordance with embodiments herein are well known in the art. For example, the database server can run on an operating system such as UNIX, running a relational database management system, a World Wide Web application and a World Wide Web server. Other types of memories and computer readable media are also contemplated to function within the scope of the some embodiments herein.

The data matrices constructed by the methods or portions thereof according to some embodiments herein can be represented in a markup language format including, for example, Standard Generalized Markup Language (SGML), Hypertext markup language (HTML) or Extensible Markup language (XML). Markup languages can be used to tag the information stored in a database or data structure of some embodiments, thereby providing convenient annotation and transfer of data between databases and data structures. In particular, an XML format can be useful for structuring the data representation of reactions, reactants and their annotations; for exchanging database contents, for example, over a network or internet; for updating individual elements using the document object model; or for providing differential access to multiple users for different information content of a data base or data structure of some embodiments. XML programming methods and editors for writing XML code are known in the art as described, for example, in Ray, Learning XML O'Reilly and Associates, Sebastopol, CA (2001).

A computer system according to some embodiments herein can further include a user interface capable of receiving a representation of one or more reactions. A user interface in accordance with some embodiments herein can also be capable of sending at least one command for modifying the data structure, the constraint set or the commands for applying the constraint set to the data representation, or a combination thereof. The interface can be a graphic user interface having graphical means for making selections such as menus or dialog boxes. The interface can be arranged with layered screens accessible by making selections from a main screen. The user interface can provide access to other databases useful in accordance with some embodiments herein, for example an in silico database of patterns of sequence specific labeling of one or more nucleic acids or pluralities thereof, for example host genomes, foreign element genomes, or other extragenomic sequences, or links to other databases having information relevant to the patterns of sequence-specific labeling of various nucleic acids. Also, the user interface can display a graphical representation of a map of patterns of genome labeling. A map of patterns of labeling, an alignment, or other information in accordance with some embodiments herein, for example, a table, graph, reaction network, flux distribution map or a as a modal matrix.

EXAMPLES

The following examples are intended to illustrate, but not to limit, the invention in any manner, shape, or form, either explicitly or implicitly. While they are typical of those that might be used, other procedures, methodologies, or techniques known to those skilled in the art may alternatively be used.

Example 1

Generation De Novo of a Genome Map

Figure 3:
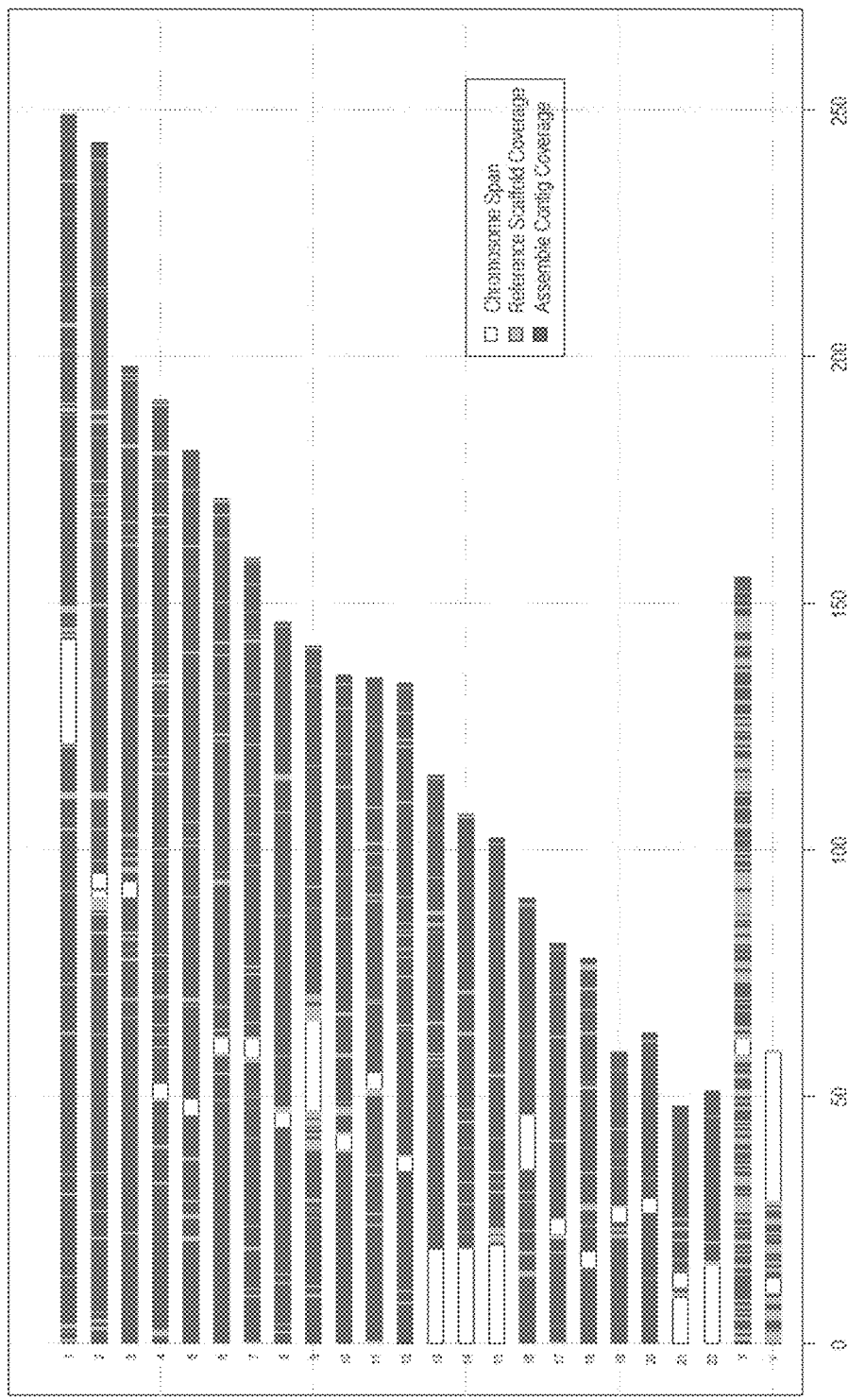
FIG. 3 is a human genome map assembly, generated de novo, and overlaid to hg19 reference in silico map in accordance with some embodiments herein. White sections are N-base regions in reference near centromeres or telomeres.

A human genome map was assembled de novo. Using the automated IRYS® nanochannel chips and automated imaging system available from Bionano Genomics, San Diego, California, genomic DNA from a human cell line was extracted and underwent site-specific labeling, and subsequently linearized and analyzed at 50× coverage on a nanochannel, with a throughput of 5-10 Gb/chip run (3-4 hrs) and further 50-200 Gb/chip run in the future. Site-specific labels were detected and distances between labels were determined, and raw molecules (>20 kb) were used in a pair-wise pattern matching and de novo assembly process. FIG. 3 shows the assembled human genome map, which indicates an ease in creating a genome map form large complex genomes. As such, a genome map from large complex genomes can be created with the methods described herein.

Example 2

Identification of Structural Variation in Comparison to a Reference Sequence

In the assembled genome of Example 1, hundreds of small and large structural variants were detected. An exemplary tandem duplication on chromosome 5 is illustrated in FIG. 4. Based on site-specific labeling patterns, the genomic sequence was assembled 30 and compared to patterns of a reference genomic sequence 32. A tandem duplication that included three additional copies of a genomic region 34, in tandem, was identified. As such, de novo genome assembly and structural variant analysis based on site-specific labeling patterns can be performed.

Example 3

Preparation of Labeled DNA

DNA was isolated using a plug lysis protocol. The skilled artisan will recognize that suitable samples of isolated DNA can be prepared using a variety of methods known in the art, in addition to the exemplary protocol provided herein. Epstein-Barr Virus (EBV)-infected cells were grown up to log phase and harvested. 2% agarose and water bath were prepared by immersing 2% agarose in boiled water for 10-15 min until melted completely, placing the agarose in a 43° C. water bath for at least 30 min before use, and warming a 50 ml tube THERMOMIXER attachment up to 50° C. and fill wells with 10-20 ml of water to simulate water bath. Cells were prepared by pelleting $4 \times 10^6$ cells into 15 ml tube, and pelting by spinning for 5 min at 2,200 rpm (1,000 rcf). The cells were washed twice in 1×PBS, resuspended in 750 μl suspension buffer, and warmed to 43° C. 250 μl of molten agarose was added to the cell suspension and mixed, and each plub mold was filled with ~95 μl volume. The plugs were cooled on ice; 2.5 ml of ProteinaseK solution with 100 μl of ProteinaseK was added and incubated at 50° C. for four hours. An additional 100 μl of ProteinaseK was added after two hours. The plugs were washed four times in wash buffer for 15 min each and 4× in TE, pH 8, each wash for 15 minutes at 200 rpm rotation at 25° C. ProteinaseK/buffer was removed, the plug was melted for 2 min at 70° C., and equilibrated at 43° C. for 5 min. 2 μl of GELase stock enzyme (0.2 U/μl) to each tube, mixed, and incubate for 45 min at 43° C. 15 μl of sample at a time was sheared with ~5 strokes of p10 pipet tip. Samples were then dropped on a wet dialysis membrane and allowed to dialyze for 4 hrs, resulting in about 40 μl of sample due to evaporation).

Site-specific labeling of DNA was performed as follows: A Nicking master mix was prepared, which included, per reaction, 1 ul of 10×NEB Buffer, 0.7 ul of 10 U/uL Nt.BspQ, and dH$_2$O up to 10 ul. 300 ng prepared DNA sample was added to the master mix, centrifuged briefly, incubated in a thermal cycler for 2 hours at 37° C., heat-inactivated for 20 min at 80° C. with a heated lid ~10° C. above the block temperature, and then held at 4° C. until ready for labeling. A Labeling master mix was prepared, which included, per reaction, 1.5 ul 1% Triton X-100, 1.5 ul 10× Labeling Mix, 1 ul 5 U/ul Taq polymerase, 1 ul dH$_2$O per reaction. 5 ul of Labeling master mix was added to 10 ul of sample, and incubated in a thermal cycler for 60 min at 72° C. with a heated lid ~10° C. above the block temperature. A repair master mix was prepared, which included, per reaction, 0.2 ul 10 mM dNTPs, 0.2 ul 50 mM NAD+, 0.75 ul PreCR mix, 0.5 ul 10× Thermo Pol, and 3.35 ul dH$_2$O. 5 ul of Repair master mix was added to 15 ul of sample, and incubated in a thermal cycler for 18 minutes at 37° C. with heated lid set ~10° C. above the block. The incubated sample was then placed on ice, 1 ul of 0.5M EDTA was added, mixed and centrifuged briefly (2-3 seconds).

A Staining master mix was prepared, which included, per sample, 15 ul 4× Flow Buffer, 12 ul 1 M DTT, 2 ul DNA Stain, and 11 ul dH$_2$O. 40 ul of the Staining master mix was combined with 20 ul of repaired DNA sample, mixed 5× with a wide bore tip, and incubated at 4° C. overnight. A Bionano IRYS™ system nanochannel chip was then loaded using a narrow bore P10 tip, placing 5.5 μl of the prepared sample into the inlet (front) well, and, after a 2 minute wait, 5.0 μl into the outlet (back) well.

Reagents used in the above protocol are listed in Table 1:

TABLE 1

Reagent List

| Component | Source | Cat# | Storage | Handling Considerations |
|---|---|---|---|---|
| 10 U/ul Nt. BspQI | NEB | R0644S | −20° C. | Invert 3x and centrifuge briefly before use. Keep on ice or in freezer block until use. |
| 10x Buffer 3 | NEB | B7003S | −20° C. | Thaw at RT. Vortex and centrifuge briefly. Keep on ice until use |
| 10x Thermopol Buffer | NEB | B9004S | −20° C. | Thaw at RT. Vortex centrifuge briefly. Keep on ice until use. |
| 5 U/ul Taq | NEB | M0267S | −20° C. | Invert 3x centrifuge briefly before use. Keep on ice or in freezer block until use. |
| PreCR Kit | NEB | M0309S | −20° C. | Invert 3x and centrifuge briefly before use. Keep on ice or in freezer block until use. |
| 50 mM NAD+ | NEB | B9007S | −20° C. | Thaw at RT. Vortex and centrifuge briefly. Keep on ice until use. Avoid repeated freeze-thaw cycles. |
| 10 mM dNTP Mix | BNG | N0447S | −20° C. | Thaw at RT. Vortex and centrifuge briefly. Keep on ice until use. |
| 1% Triton X-100 | BNG | | 4° C. | — |
| 10X Labeling Mix | BNG | | −20° C. | Thaw at RT. Vortex and centrifuge briefly. Keep on ice until use. |
| 4x Flow Buffer | BNG | | 4° C. | Vortex centrifuge briefly. Keep at RT until use. |
| 1M DTT | BNG | | −20° C. | Thaw at RT. Vortex and centrifuge briefly. Keep at RT until use. |
| DNA Stain | BNG | | −20° C. | Thaw at RT. Vortex and centrifuge briefly. Keep at RT until use as DMSO will crystallize on ice. |
| 0.5M EDTA | BNG | | RT | — |
| Ultrapure dH2O | BNG | | RT | — |

Example 4

Generation of a Human Genome Assembly to Identify Viral Sequences Inserted Therein From the EBV-infected lymphocyte samples prepared as in Example 3, 300 Gb of data were collected for molecules over 100 kb, and used for de novo human genome assembly. Patterns of site-specific labeling were aligned, and consensus maps were generated. Some sequences corresponded to a reference human genome assembly. Additional consensus maps not matching the human reference were identified, as shown in FIG. 5 (e.g. "viral sequences"). One of the consensus maps was identified as Epstein-Barr Virus (EBV). Variations within the viral consensus sequences were used for strain typing (see FIG. 5, dotted box).

At least some sequences flanking the individual viral sequences (see FIG. 5, dashed box), which did no align to the viral consensus sequence, represented genomic insertion sites of the viral sequence, and could be used to determine positions of the human genome into which the flanked viral sequence was inserted.

As such, the methods of labeling the polynucleotides of the lymphocyte samples described in Example 4, and subjecting them to linearization and analysis at 50× coverage on a nanochannel can provide a genome map which shows the host genome integration of the viral signature sequences and be used for determining the strain typing.

Example 5

Detection of Viral Load in a Host Genome

Figure 6A:
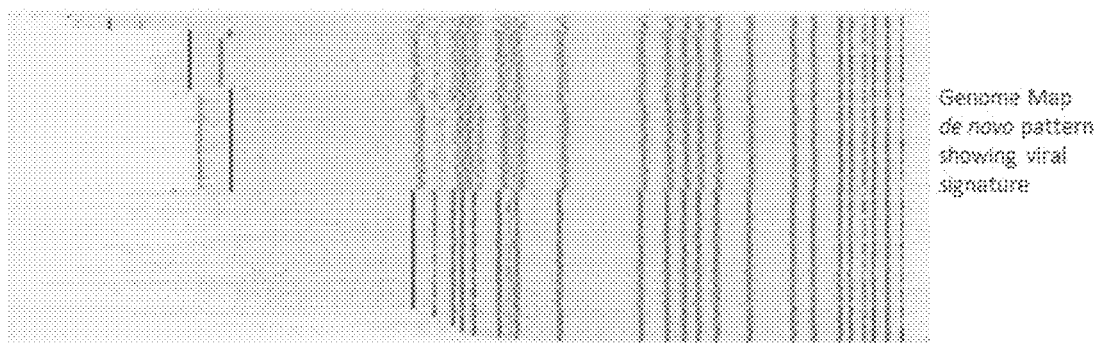
FIGS. 6A-B are schematic illustrations of discovery of viral components de novo in a host genome in accordance with some embodiments herein.

Based on the consensus pattern of patterns identified as characteristic of viral sequences as in Example 5, a consensus viral signature pattern was identified (see FIG. 6A). The consensus viral signature pattern was compared to a pattern identified in silico based on a reference EBV sequence (see FIG. 6A).

Figure 6B:
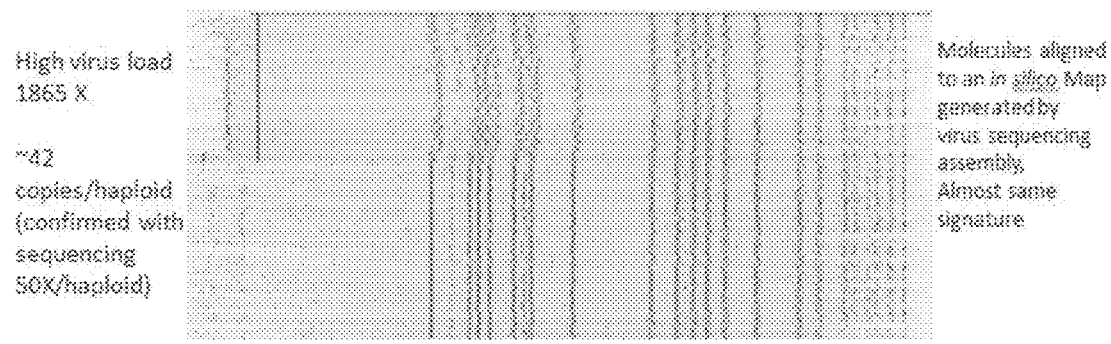

Viral load in the human host genome was calculated based on the copy number of viral signature patterns throughout the genome (see FIG. 6B). It was determined that approximately 42 copies of retrovirus were present per haploid human host genome. The genome was sequenced (50×/haploid), and this calculation of viral load was confirmed.

As such the methods and techniques can be used to determine the copies of viral DNA that is integrated into the human host genome.

Example 6

Analysis of a Cancer Cell Lineage

Genomic DNA from lymphatic leukemia cells from each of 1,000 different patients is provided. The genomic DNA from each patient's cell is provided, and is prepared, labeled, and linearized according to the general procedure described in Example 3. A genomic pattern is assembled from a single leukemia cell form each patient, and is compared to a reference genomic pattern of a healthy individual. Patterns of rearrangement, insertion, and deletion of genomic material of the leukemia cell are identified. Patterns found in the genome of the leukemia cell but not in the reference genome are determined to be likely extragenomic elements in the cancer cell. Patterns of extragenomic sequences are aligned, and a signature pattern of at least one extragenomic sequence is identified. This analysis is performed for each of the 1,000 different patients. Structural features common to genomes of subpopulations of lymphatic leukemia cells are identified. "Hot spots" for viral insertion are identified. "Hot spots" for rearrangement are identified. Patterns associated with various leukemia-associated structural features are identified.

Various leukemia cells from each of patient are staged based on accumulation of structural features. Leukemia cells from a single lineage are characterized based on accumulation of structural features such as retroviral insertions. A lineage of leukemia cells is staged.

Personalized predisposition of healthy individuals for developing lymphatic leukemia is inferred based on accumulation of leukemia-associated structural features in cells of the hematopoietic lineage in these healthy individuals.

As such, the de novo nanochannel genome mapping assembly can be performed to examine particularly large genomes, and was used to determine leukemia signature patterns in the genomes of leukemia patients.

Example 7

Detection of Foreign Elements in a Human Sample

For the detection of foreign elements in a human sample, foreign element genomes used in the feasibility study used for simulation was tested using different species of *Trypanasoma* as well as *Plasmodium*. The human and foreign element data was collected using an automated IRYS® platform and processed for analysis using RefAligner. As shown in a table of FIG. 14, the maps were created from *T. cruzi*, *T. brucei*, *T. pallidum*, and *P. falciparum*.

In order to test the feasibility of determining a foreign element from a sample, datasets of a mixture of foreign element and human blood were simulated in which the sample contained 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, and 50% foreign elementic nucleic acid in the mixture. For each enzyme, a reference map of all the contigs were generated which consisted of the human genome and all the foreign element genomes. The molecules were then aligned to the different datasets to the in silico references genomes using a "bestRef" option. This was used to detect false negatives, in which the program could not detect foreign elements even though the foreign elements existed, and false positives, in which it can detect foreign elements when only human material exists, in the absence of foreign element material.

Figure 13:
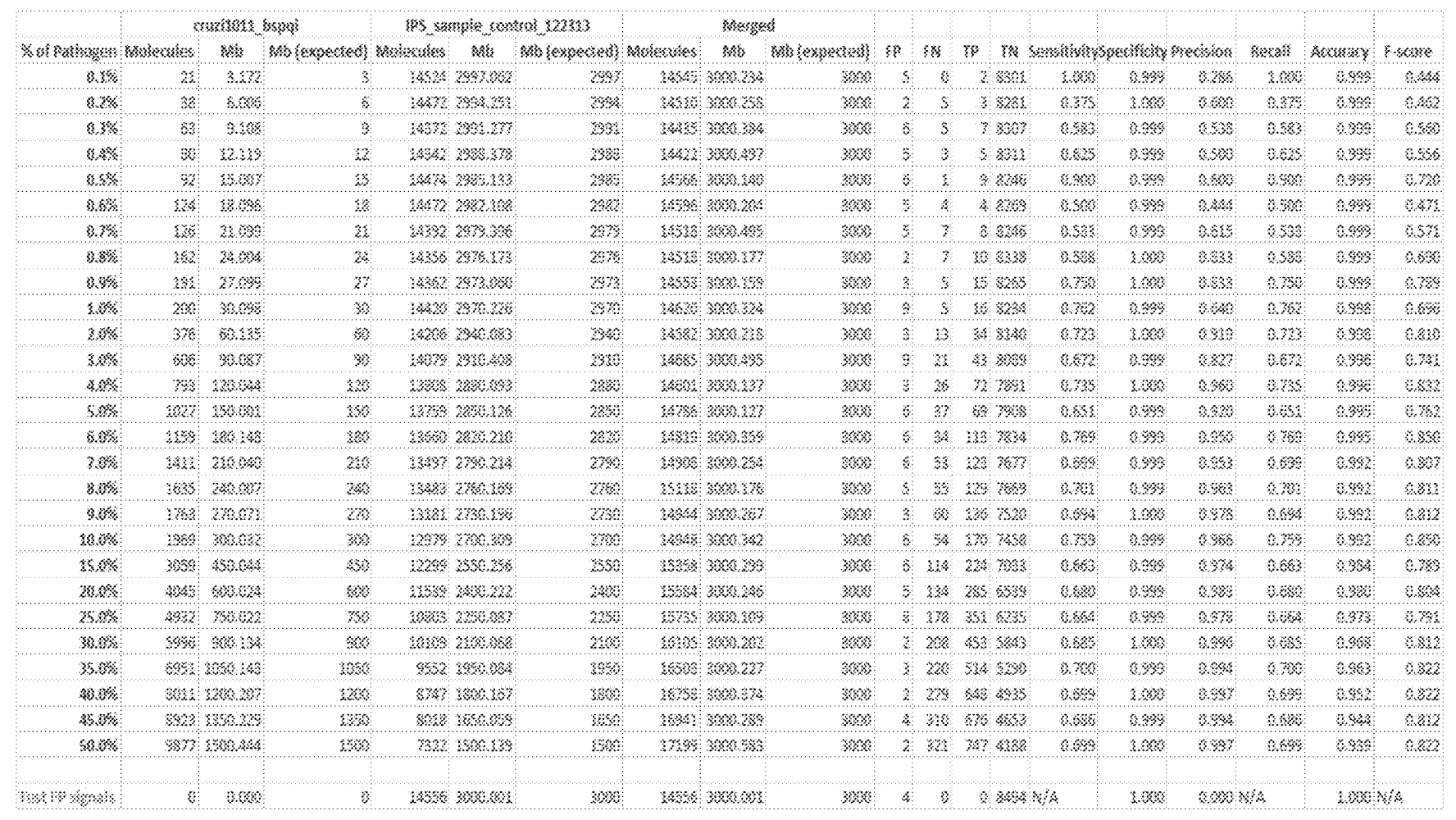

Experimentally observed molecules from a human female sample (IPS_sample_control_122313) were in-silico mixed with experimentally observed molecules from *Trypanosoma* in different proportions. Each molecule is labeled with a unique ID, enabling the origin of the aligned foreign element and human DNA molecules, as well as the correctness of the alignment. Sensitivity is defined as TP/(TP+FN). Specificity is defined as TN/(TN+FP). Precision is defined as TP/(TP+FP). Recall=TP/(TP+FN). Accuracy is defined (TP+TN)/(TP+TN+FP+FN). F-score is defined as 2(precision·recall)/(precision+recall). The results are shown in FIG. 13. With reference to FIG. 13, FP=false positive, FN=false negative, TP=true positive, TN=True negative. Accordingly, in silico analysis indicates that the presence or absence of foreign element genomes can be distinguished from human host genomes based on patterns of labeling in accordance with some embodiments herein.

Figure 11:
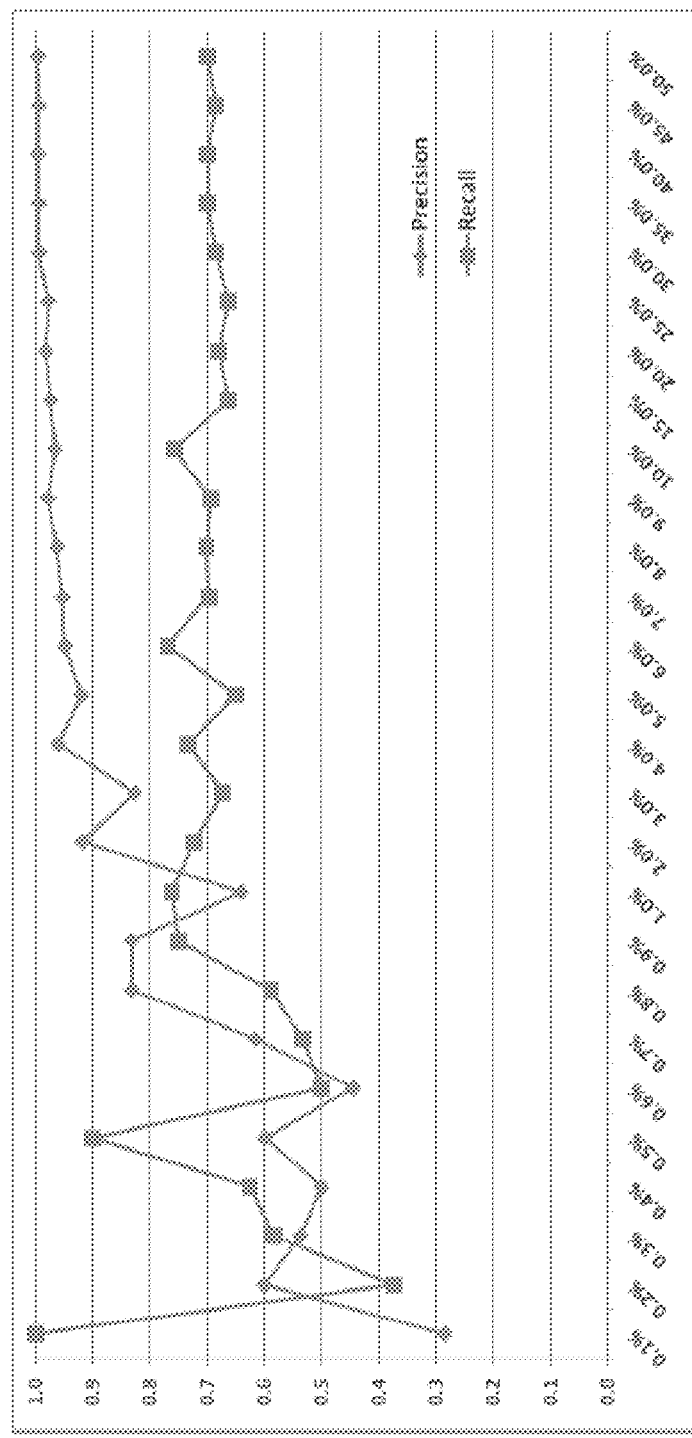
FIG. 11 is a graph illustrating the confidence value in relationship to the amount of foreign element in a sample from the results of the in-silico study in accordance with some embodiments herein, as shown in FIG. 14.

As shown in FIG. 11, which illustrates the graphical presentation of the results from FIG. 13, when the amount of the foreign element DNA exceeds 2%, the confidence of the foreign element detection is high (95% precision and 70% recall). As shown, when the amount of the foreign element is greater than 2%, there is a relatively high confidence as seen from the precision and the recall, 95% and 70%, respectively.

As such, the technique was used to determine the foreign element at 95% precision and a 70% recall when the foreign element was at 2%.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

What is claimed is:

1. A method of determining the presence or absence of one or more foreign elements in a subject, the method comprising:
   obtaining a biological sample of the subject, the biological sample comprising polynucleotides, wherein the polynucleotides comprise a genome of the subject;
   removing host polynucleotides from the biological sample, wherein the host polynucleotides are bound with a methyl-CpG binding domain (MBD), and wherein the removal of the host polynucleotides comprises binding the methyl-CpG binding domain with protein A magnetic beads;
   labeling the polynucleotides in a sequence-specific manner to provide a pattern of sequence-specific labels on the polynucleotides, wherein the labeling comprises non-cutting labeling of the polynucleotides, and wherein labeling the polynucleotides in the sequence-specific manner to provide the pattern of sequence-specific labels on the polynucleotides comprises labeling the polynucleotides with labeling probes or enzymes having a lower label density for the genome of the subject than for the foreign elements;
   linearizing the polynucleotides in nanochannels following labeling, whereby the nanochannels comprise labeled single molecule polynucleotides;
   obtaining images of labeled single-molecule polynucleotides linearized in the nanochannels;
   processing the images into digital representations of relative label locations in the polynucleotides;
   aligning the relative label locations on the polynucleotides in silico against a foreign reference map comprising relative locations of labels on foreign elements, thereby determining a quantity of the polynucleotides that align to relative locations of label locations of foreign elements, wherein the foreign reference map comprising relative locations of labels on foreign elements comprises a label density of about 5 labels to about 20 labels per 100 kb; and
   determining the presence of foreign elements in the subject when the quantity exceeds a limit of detection, wherein the one or more foreign elements comprise a viral sequence and/or a transposable element sequence.

2. The method of claim 1, wherein the foreign reference map comprises relative locations of labels of at least three different foreign elements.

3. The method of claim 1, wherein the quantity of polynucleotides that align to relative locations of labels on foreign elements is normalized with respect to a quantity of polynucleotides aligned to a host reference map to yield an estimate of a fraction of foreign element material in the biological sample.

4. The method of claim 1, further comprising:
   aligning the relative locations on the polynucleotides in silico against a host reference comprising relative locations of labels in a genome of the subject.

5. The method of claim 1, wherein the limit of detection is calculated from variability observed in multiple controls and samples containing different concentrations of host and foreign element nucleic acids.

6. The method of claim 1, wherein determining the presence of foreign elements in the subject comprises determining a probability that each of the foreign elements is present in the biological sample, and classifying the foreign elements as present when the probability exceeds a predefined confidence level.

7. The method of claim 1, wherein the labeling the polynucleotides comprises a probe having a melting temperature of 66° C. to 75° C.

8. The method of claim 1, wherein non-cutting labeling non-cutting label is applied by at least one of a, a non-cutting restriction enzyme, a zinc-finger protein, an antibody, a transcription methyltransferase factor, a DNA binding protein, a hairpin polyamide, a triplex-forming oligodeoxynucleotide, and a peptide nucleic acid.

9. The method of claim 1, wherein the non-cutting labeling is applied by a methyltransferase.

10. The method of claim 1, wherein the labeling the polynucleotides comprises a probe having an annealing temperature of 1° C. to 20° C. less than the melting temperature.

11. The method of claim 1, wherein the polynucleotides that align to relative locations of label locations of foreign elements further comprises a flanking sequence, thus identifying a site of integration of the foreign elements to a host genome.

12. The method of claim 1, wherein labeling comprises forming a D-loop in the polynucleotides and hybridizing at least one specific probe(s) to a first strand of the polynucleotides at the D loop with higher affinity than to a complementary strand of the first strand.

* * * * *

SEQUENCE LISTING

```
<160> NUMBER OF SEQ ID NOS: 3

<210> SEQ ID NO 1
<211> LENGTH: 51
<212> TYPE: DNA
<213> ORGANISM: Artificial Sequence
<220> FEATURE:
<223> OTHER INFORMATION: Synthetic polynucleotide

<400> SEQUENCE: 1
tgaggtttgc accggtgtgg ctccggaagt taacgctaaa gcactggcct g            51

<210> SEQ ID NO 2
<211> LENGTH: 77
<212> TYPE: DNA
<213> ORGANISM: Artificial Sequence
<220> FEATURE:
<223> OTHER INFORMATION: Synthetic polynucleotide

<400> SEQUENCE: 2
caccctgctt gctgaggttt gcaccggtgt ggctccggaa gttaacgcta aagcactggc   60
ctggggaaaa cagtacg                                                  77

<210> SEQ ID NO 3
<211> LENGTH: 77
<212> TYPE: DNA
```

```
<213> ORGANISM: Artificial Sequence
<220> FEATURE:
<223> OTHER INFORMATION: Synthetic polynucleotide

<400> SEQUENCE: 3
cgtactgttt tccccaggcc agtgctttag cgttaacttc cggagccaca ccggtgcaaa      60
cctcagcaag cagggtg                                                    77
```